US009547330B2

(12) United States Patent
Okada

(10) Patent No.: US 9,547,330 B2
(45) Date of Patent: Jan. 17, 2017

(54) PROCESSOR AND CONTROL METHOD FOR PROCESSOR

(71) Applicant: SOCIONEXT INC., Yokohama, Kanagawa (JP)

(72) Inventor: Masaki Okada, Owariasahi (JP)

(73) Assignee: SOCIONEXT INC., Yokohama (JP)

(*) Notice: Subject to any disclaimer, the term of this patent is extended or adjusted under 35 U.S.C. 154(b) by 609 days.

(21) Appl. No.: 14/049,039

(22) Filed: Oct. 8, 2013

(65) Prior Publication Data

US 2014/0108848 A1    Apr. 17, 2014

(30) Foreign Application Priority Data

Oct. 12, 2012    (JP) .................................. 2012-227151

(51) Int. Cl.
*G06F 13/36* (2006.01)
*G06F 1/08* (2006.01)
(Continued)

(52) U.S. Cl.
CPC ............... *G06F 1/08* (2013.01); *G06F 1/3237* (2013.01); *G06F 1/324* (2013.01); *G06F 13/364* (2013.01); *Y02B 60/1221* (2013.01)

(58) Field of Classification Search
CPC .. G06F 13/1615; G06F 13/364; G06F 1/3237; H04L 47/60; H04L 47/782
(Continued)

(56) References Cited

U.S. PATENT DOCUMENTS 6,119,196 A     9/2000  Muller et al.
7,143,219 B1 *  11/2006 Chaudhari ............ G06F 13/364
                                                710/111
(Continued)

FOREIGN PATENT DOCUMENTS

JP    2002-508099 A     3/2002
JP    2002-312309 A     10/2002
(Continued)

OTHER PUBLICATIONS

Japanese Office Action, Notification of Reasons for Rejection dated Jul. 26, 2016 for Japanese Patent Application No. 2012-227151, English Translation. 2 Pages.

*Primary Examiner* — Brian Misiura
(74) *Attorney, Agent, or Firm* — Arent Fox LLP

(57) ABSTRACT

A processor includes a plurality of processing units. A plurality of first arbitration units each arbitrate request signals output from at least two of the processing units to generate a first arbitration signal. A second arbitration unit arbitrates first arbitration signals output from the first arbitration units to generate a second arbitration signal. A plurality of clock controllers, arranged in correspondence with the first arbitration units, each generate a clock signal supplied to a corresponding first arbitration unit and the processing units coupled to the corresponding first arbitration unit. A control unit determines whether or not to operate each processing unit in accordance with an operation state of the processor and generates control information according to the determination result. Each of the clock controllers supplies or stops the clock signal or changes a frequency of the clock signal in accordance with the control information.

10 Claims, 15 Drawing Sheets

(51) Int. Cl.
*G06F 13/364* (2006.01)
*G06F 1/32* (2006.01)

(58) Field of Classification Search
USPC .......................................................... 710/243
See application file for complete search history.

(56) References Cited

U.S. PATENT DOCUMENTS

| | | | | |
|---|---|---|---|---|
| 7,149,828 | B2 * | 12/2006 | Hayashi | G06F 13/364 |
| | | | | 710/119 |
| 7,155,618 | B2 * | 12/2006 | Moyer | G06F 1/3203 |
| | | | | 713/320 |
| 7,478,183 | B2 * | 1/2009 | Pathak | G06F 13/364 |
| | | | | 710/113 |
| 7,930,456 | B1 * | 4/2011 | Davis | H04L 29/06 |
| | | | | 710/107 |
| 8,122,279 | B2 * | 2/2012 | Yamaoka | G06F 13/364 |
| | | | | 713/500 |
| 8,650,347 | B2 * | 2/2014 | Okada | G06F 13/362 |
| | | | | 710/116 |
| 8,688,881 | B2 * | 4/2014 | Naylor | G06F 13/1663 |
| | | | | 710/240 |
| 9,003,217 | B2 * | 4/2015 | Yamashita | G06F 1/3253 |
| | | | | 710/110 |
| 2005/0198429 | A1 | 9/2005 | Hoshi et al. | |
| 2007/0038829 | A1 * | 2/2007 | Tousek | G06F 13/1663 |
| | | | | 711/167 |
| 2007/0174529 | A1 * | 7/2007 | Rodriguez | H04L 12/66 |
| | | | | 710/240 |
| 2008/0059674 | A1 * | 3/2008 | Shi | G06F 13/364 |
| | | | | 710/243 |
| 2010/0057962 | A1 | 3/2010 | Okada | |

FOREIGN PATENT DOCUMENTS

| | | |
|---|---|---|
| JP | 2003-099149 A | 4/2003 |
| JP | 2005-250653 A | 9/2005 |
| JP | 2010-055389 A | 3/2010 |

* cited by examiner

Fig.2

| Mode | Arbitration Unit [2] | Arbitration Unit [3] | Arbitration Unit [4] | Arbitration Unit [5] | Operation |
|---|---|---|---|---|---|
| Live View | × | × | × | × | Power ON, Photographing Standby |
| Still-image Photographing | × | ○ | ○ | × | Still-image Mode, Shutter Pressed |
| Moving-image Photographing | ○ | × | ○ | × | Moving-image Mode, Recording Button Pressed |
| High Quality Still-image Photographing | × | ○ | ○ | ○ | High Quality Photographic Mode, Shutter Pressed |
| Still-image Reproduction | × | ○ | ○ | × | Still-image Mode, Reproduction Button Pressed |
| Moving-image Reproduction | ○ | × | ○ | × | Moving-image Mode, Reproduction Button Pressed |
| Slide Show Reproduction | × | ○ | ○ | ○ | Slide Show with Display Effect Selected |

Fig.9

| Priority Flag | Effective Signal 1 | Effective Signal 2 | Selection Result |
|---|---|---|---|
| 0 | 1 | 0 | Effective Signal 1 |
| 0 | 1 | 1 | Effective Signal 1 |
| 0 | 0 | 1 | Effective Signal 2 |
| 0 | 0 | 0 | don't care |
| 1 | 0 | 1 | Effective Signal 2 |
| 1 | 1 | 1 | Effective Signal 2 |
| 1 | 1 | 0 | Effective Signal 1 |
| 1 | 0 | 0 | don't care |

Fig.10

| Inter-level Arbitration Signal 1 | Inter-level Arbitration Signal 2 | Effective Signal 3 | Selection Result |
|---|---|---|---|
| 1 | 0 | X | Channel Number 1 |
| 1 | 1 | X | Channel Number 1 |
| 0 | 1 | X | Channel Number 2 |
| 0 | 0 | 1 | Channel Number 3 |
| 0 | 0 | 0 | don't care |

PROCESSOR AND CONTROL METHOD FOR PROCESSOR

CROSS-REFERENCE TO RELATED APPLICATIONS

This application is based upon and claims the benefit of priority from prior Japanese Patent Application No. 2012-227151, filed on Oct. 12, 2012, the entire contents of which are incorporated herein by reference.

FIELD

This disclosure relates to a processor and a control method for the processor.

BACKGROUND

An electronic device such as a digital still camera includes a plurality of processing units for processing data and a memory for storing data. Each processing unit reads data from the memory and writes processed data into the memory. These accesses to the memory are asynchronously occurred. There is a case where access requests from the processing units to the memory contend with each other. To address such a contention, the electronic device includes an arbitration device. The arbitration device is arranged between a plurality of processing units and a memory and arbitrates requests to access the memory. Japanese National Phase Laid-Open Patent Publication No. 2002-508099 and Japanese Laid-Open Patent Publication Nos. 2005-250653 and 2002-312309 describe examples of such an arbitration device.

The number of processing units arranged in an electronic device increases due to, for example, multifunctional purposes. Any increase in the number of processing units causes an increase in power consumed by the electronic device. There is a demand for a reduction in power consumption in the electronic device.

SUMMARY

One aspect of this disclosure is a processor. The processor includes a plurality of processing units. A plurality of first arbitration units each arbitrate request signals output from at least two of the processing units to generate a first arbitration signal. A second arbitration unit arbitrates first arbitration signals output from the first arbitration units to generate a second arbitration signal. A plurality of clock controllers, arranged in correspondence with the first arbitration units, each generate a clock signal supplied to a corresponding first arbitration unit and the processing units coupled to the corresponding first arbitration unit. A control unit determines whether or not to operate each processing unit in accordance with an operation state of the processor and generates control information according to a determination result. Each of the clock controllers supplies or stops the clock signal or changes a frequency of the clock signal in accordance with the control information.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

The embodiment, together with objects and advantages thereof, may best be understood by reference to the following description of the presently preferred embodiments together with the accompanying drawings in which:

BRIEF DESCRIPTION OF THE DRAWINGS

Figure 1:
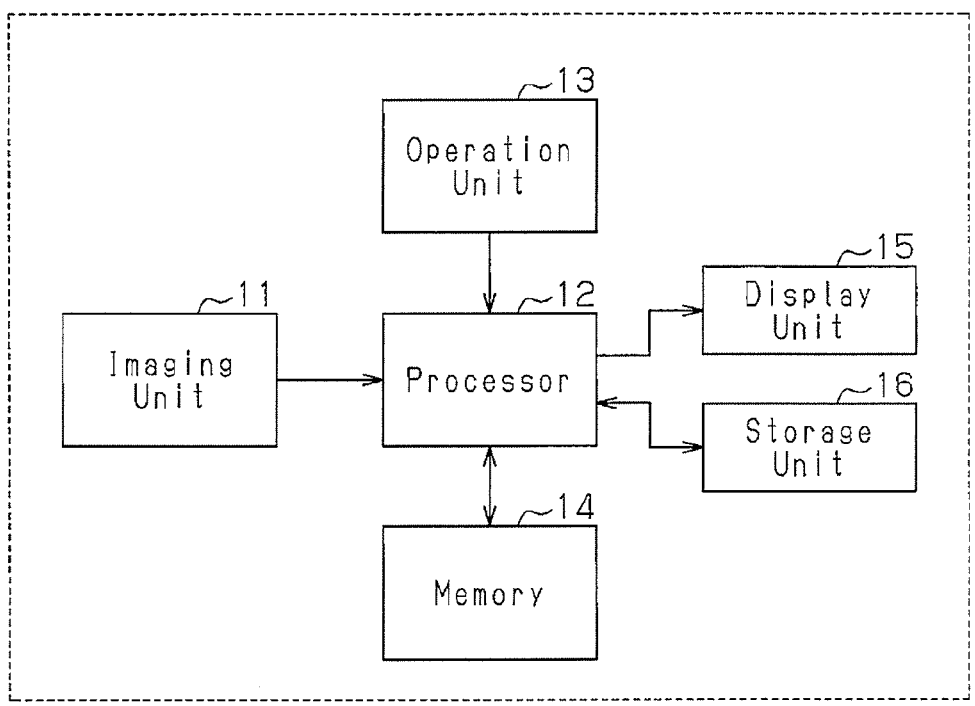
Figure 3:
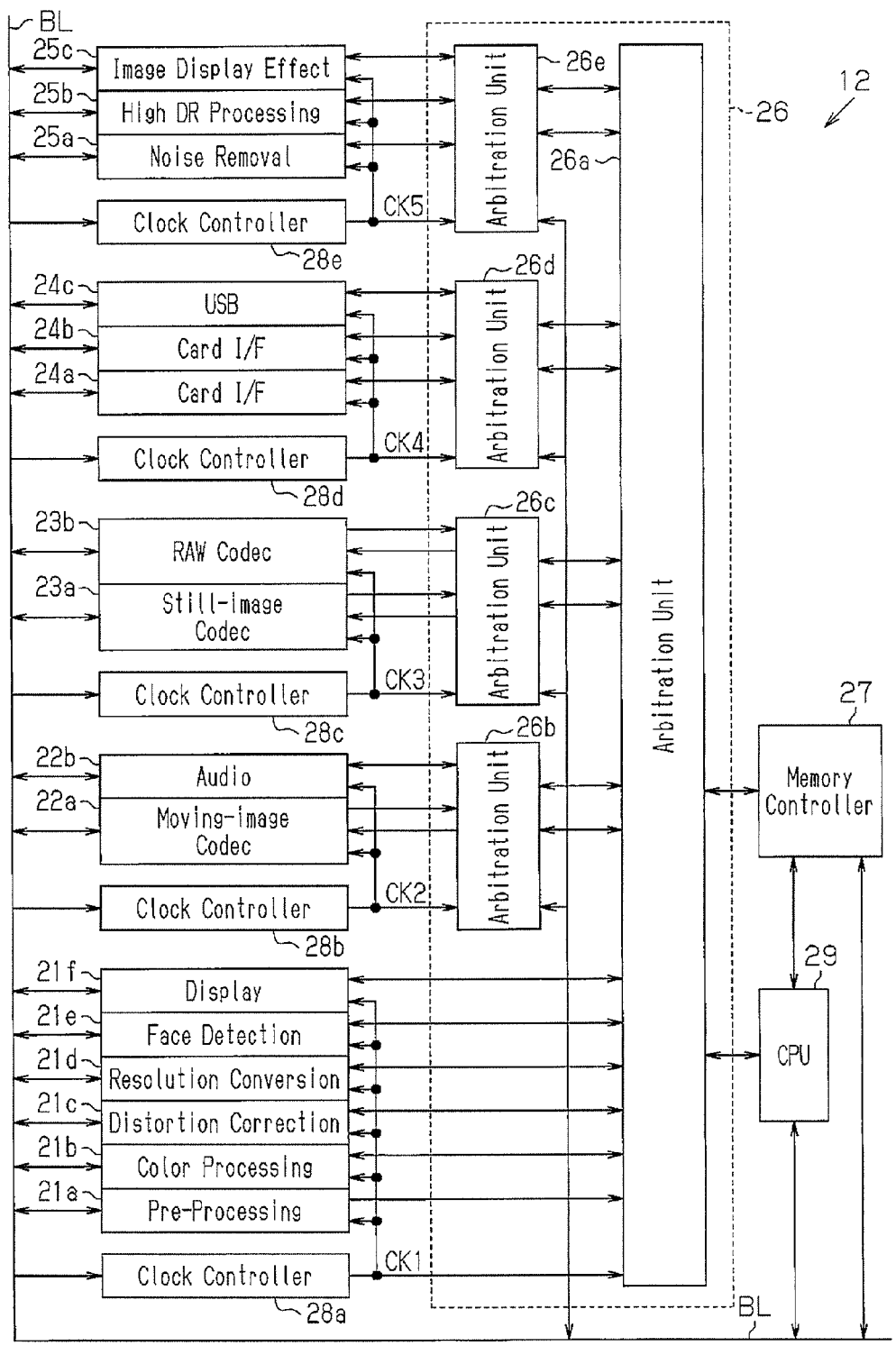
Figure 4:
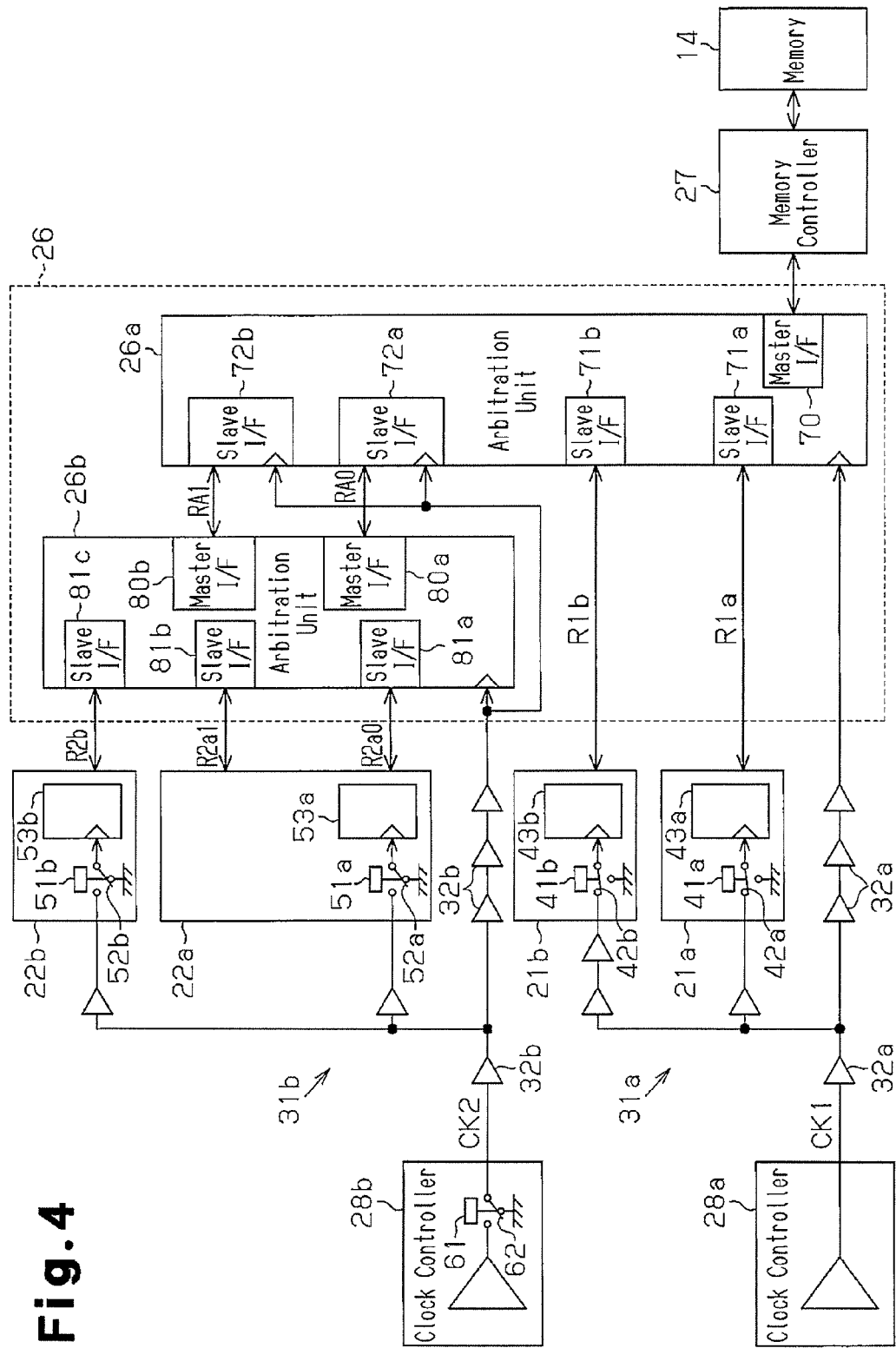
Figure 5:
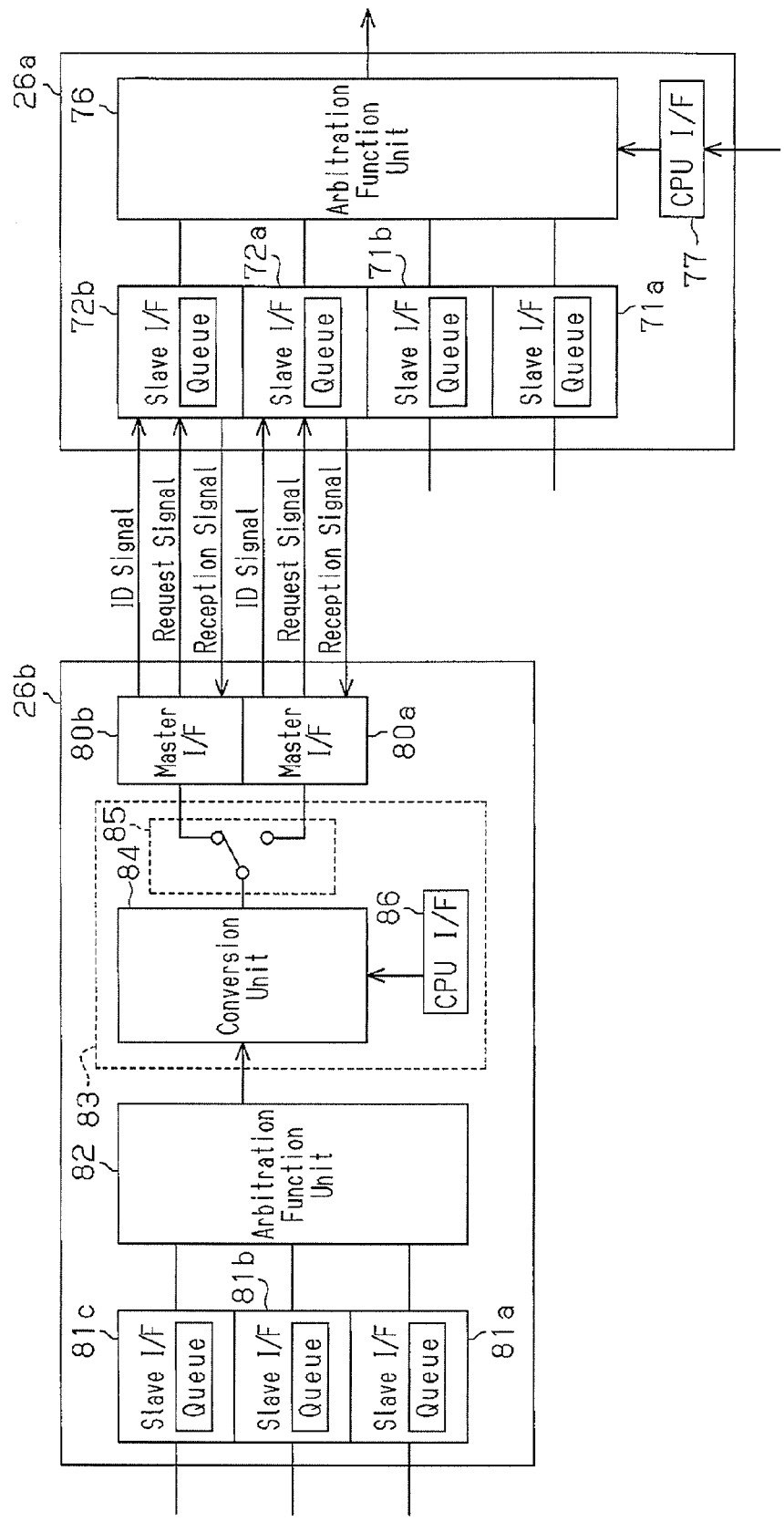
Figure 6:
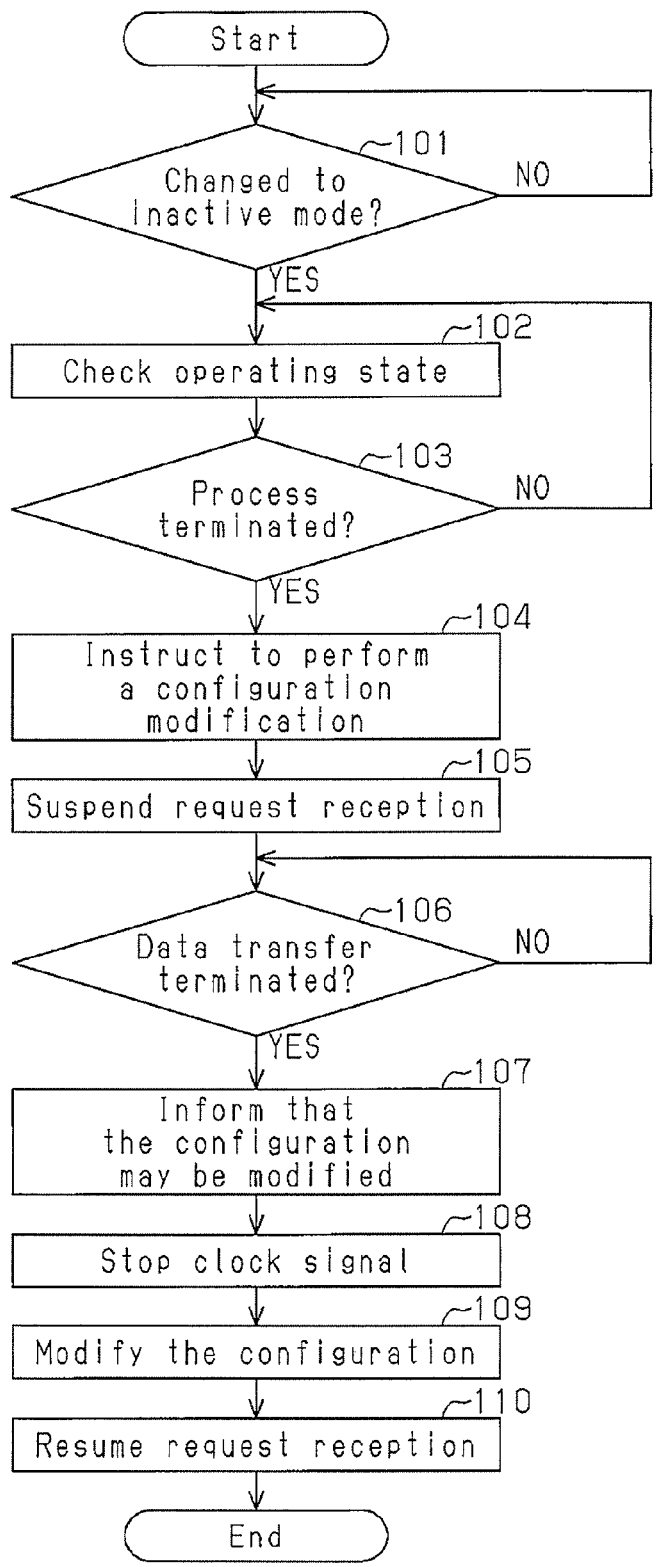
Figure 7:
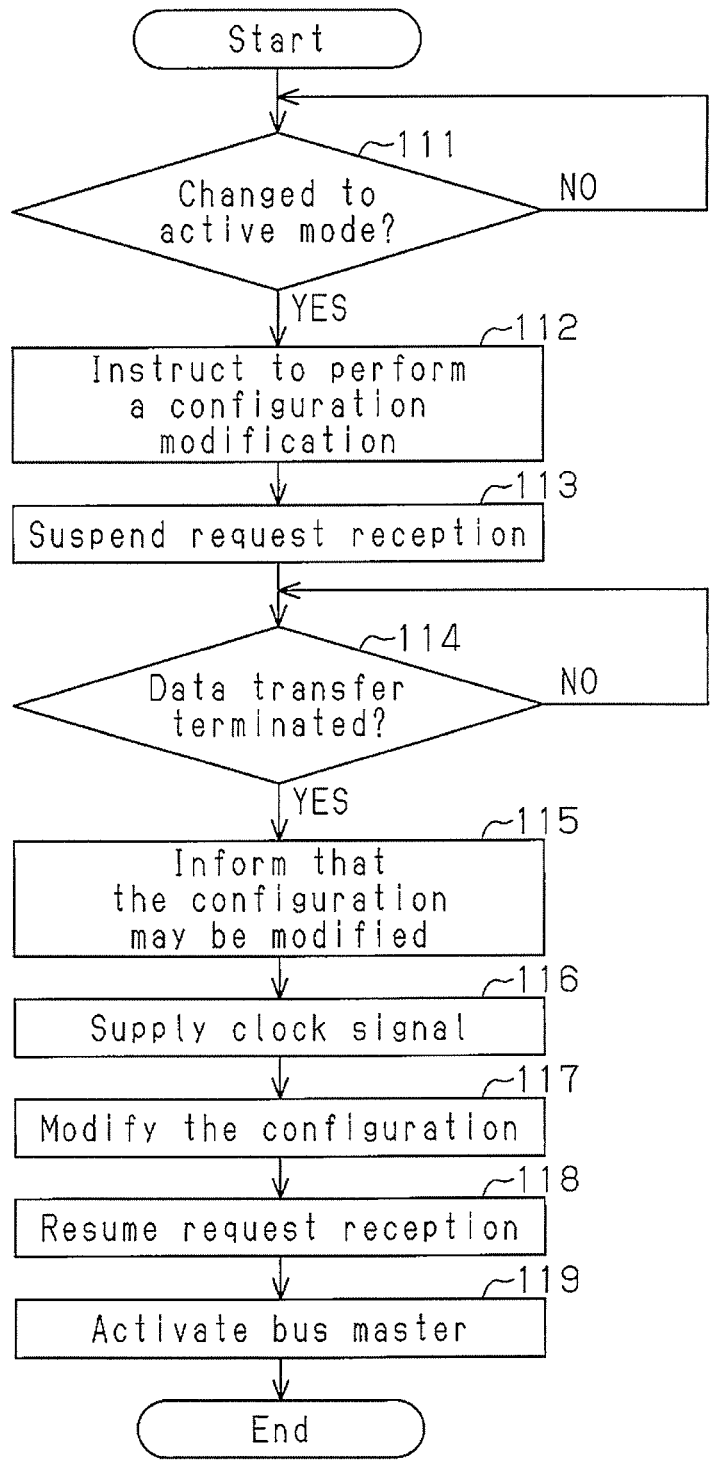
Figure 8:
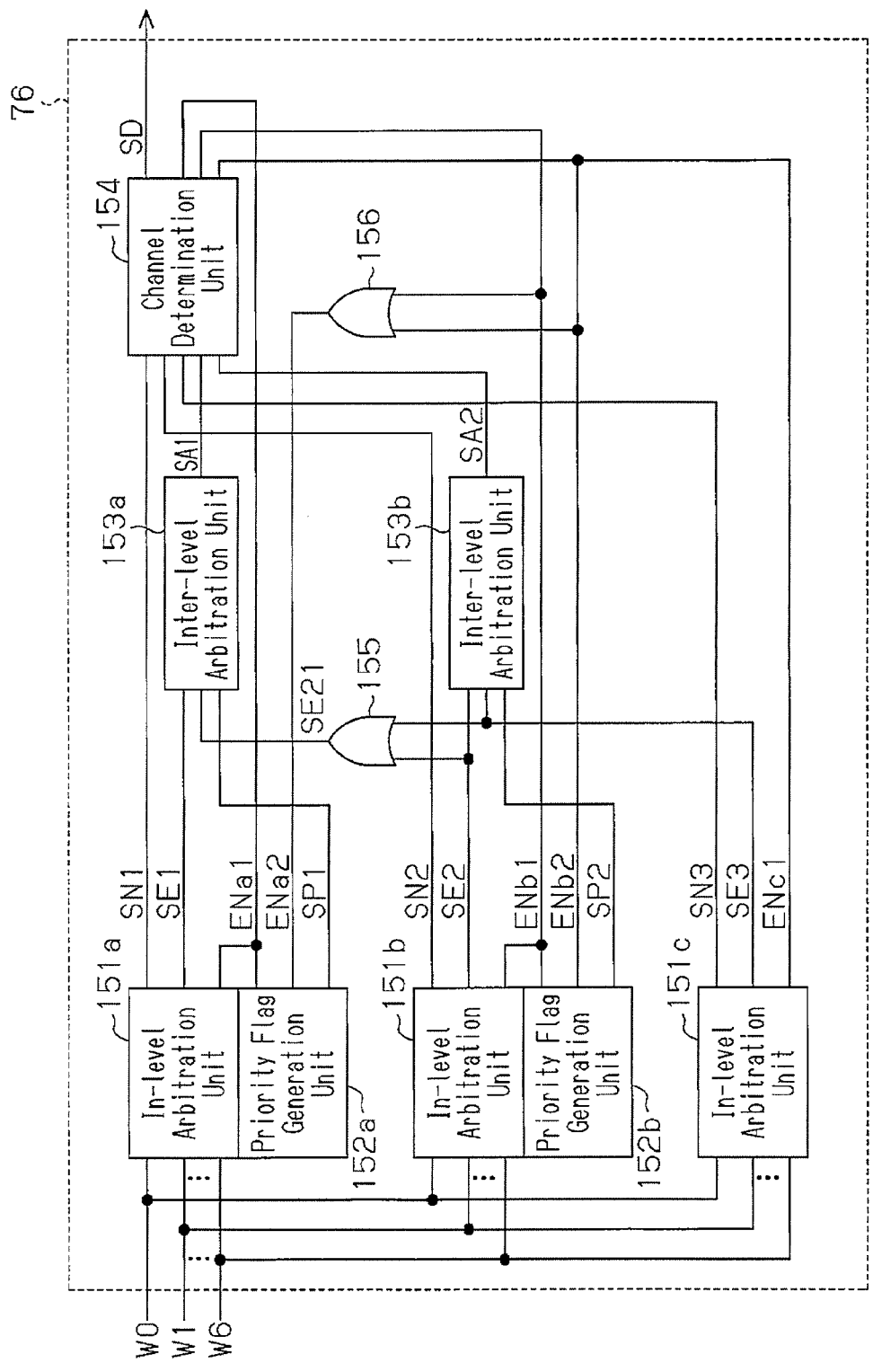
Figure 11:
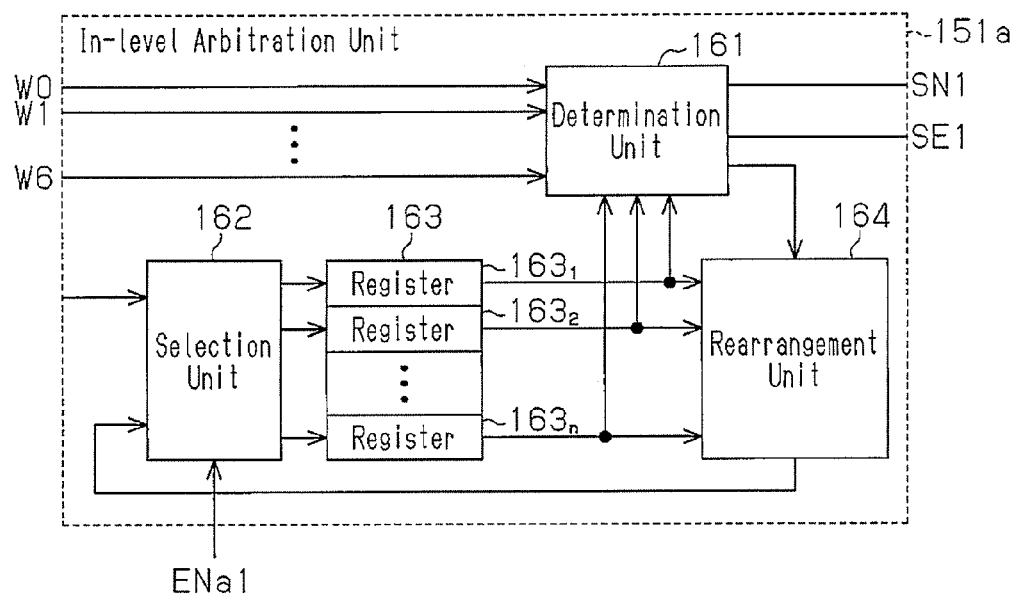
Figure 12:
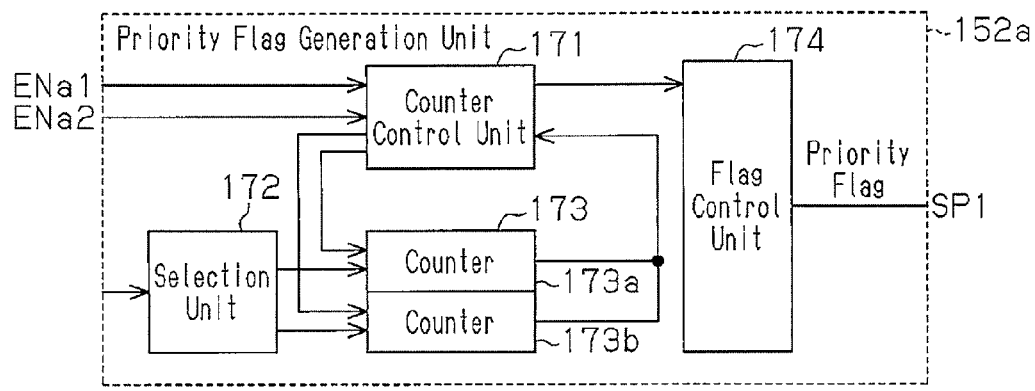
Figure 13:
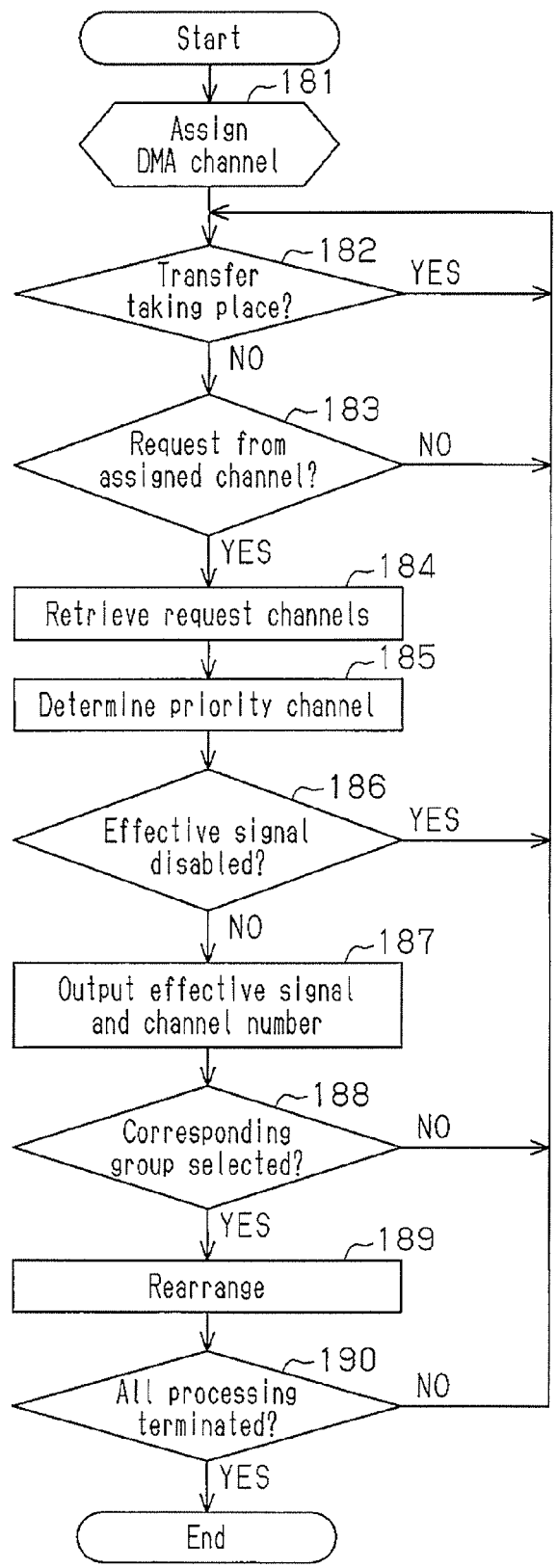
Figure 14:
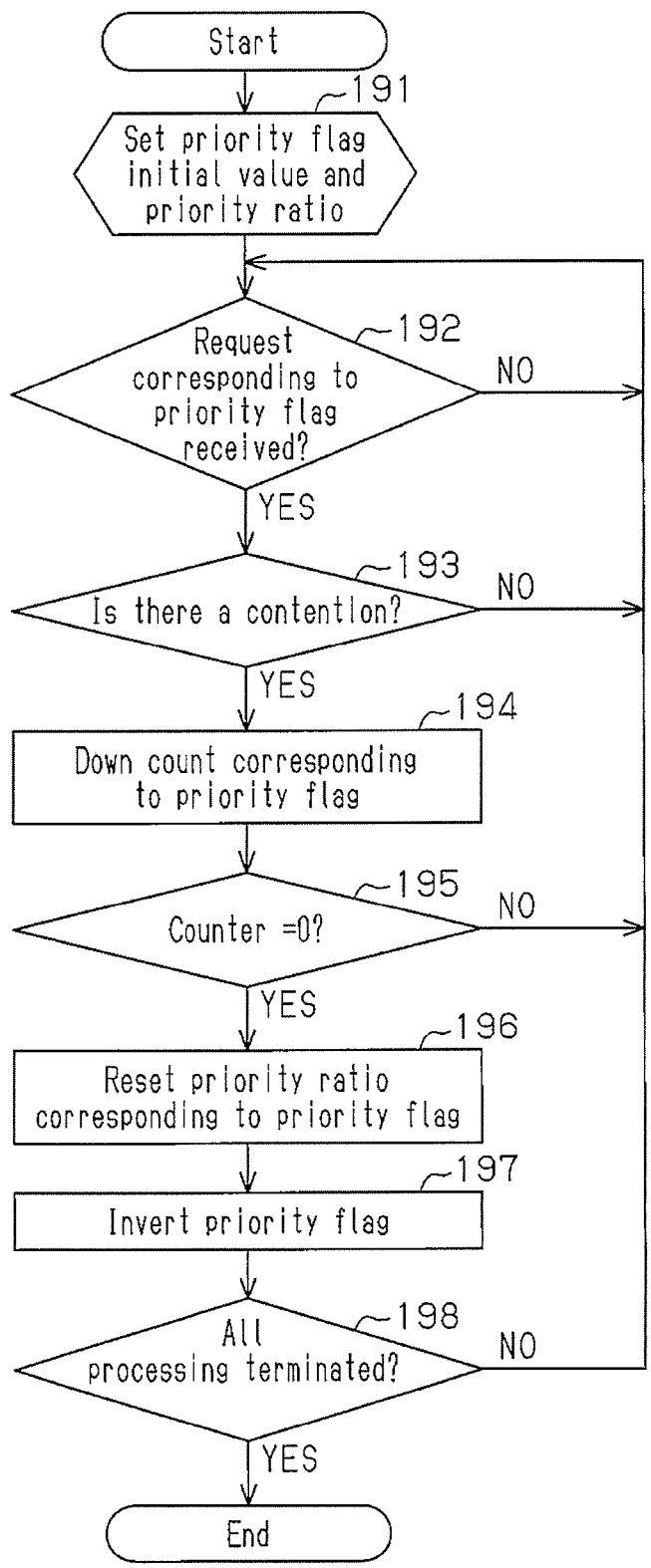
Figure 15:
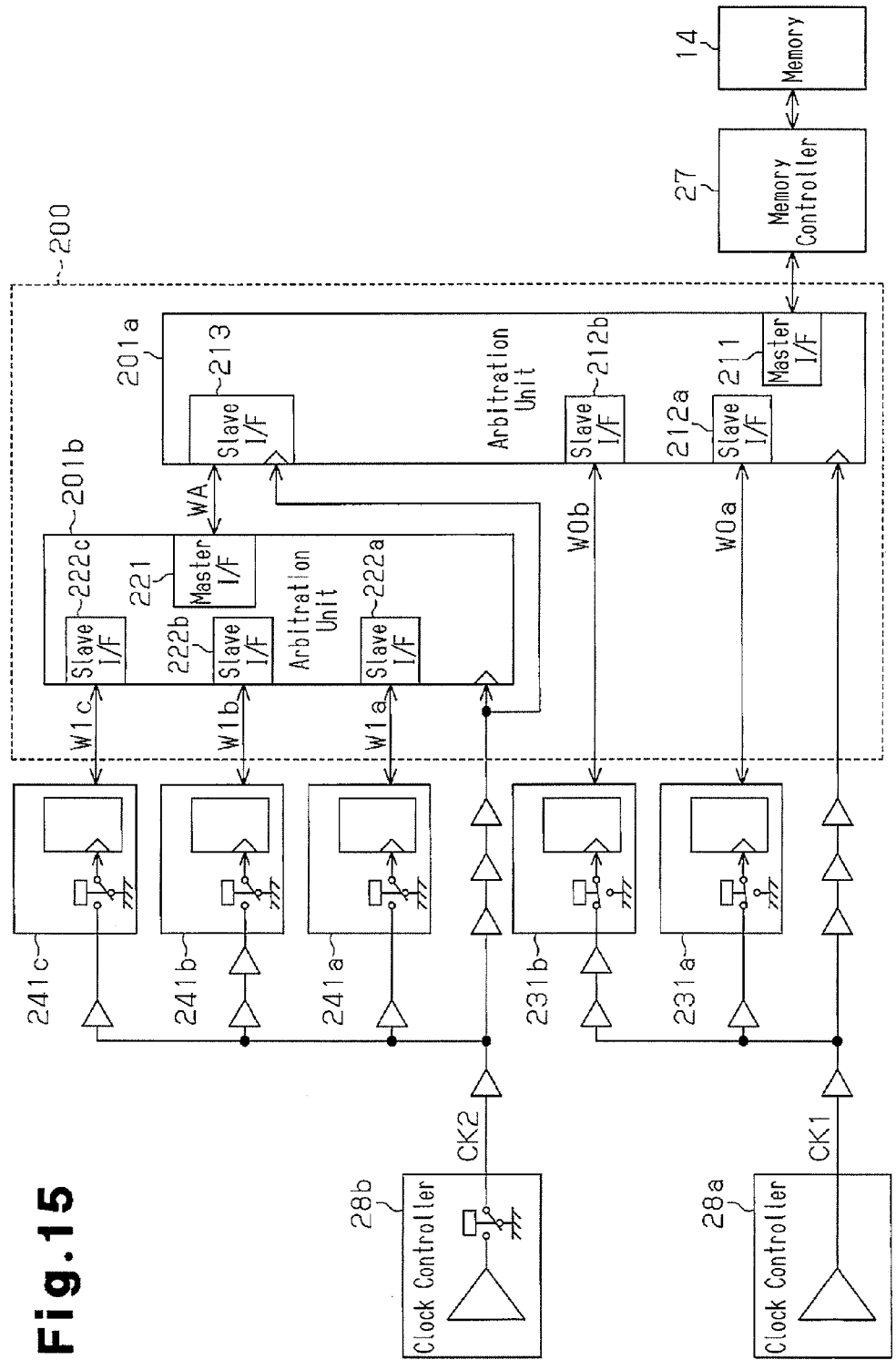
Figure 16:
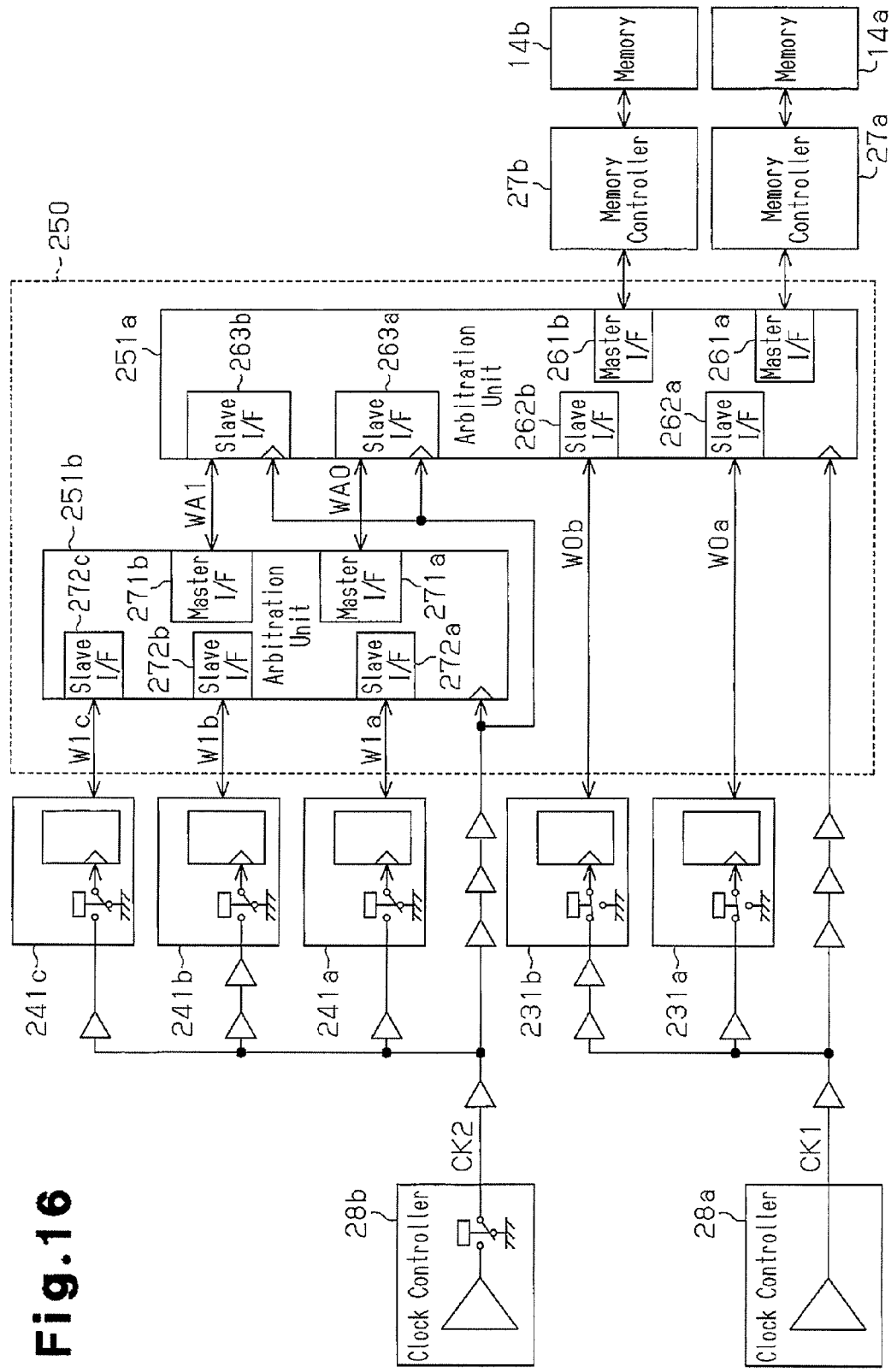
Figure 17:
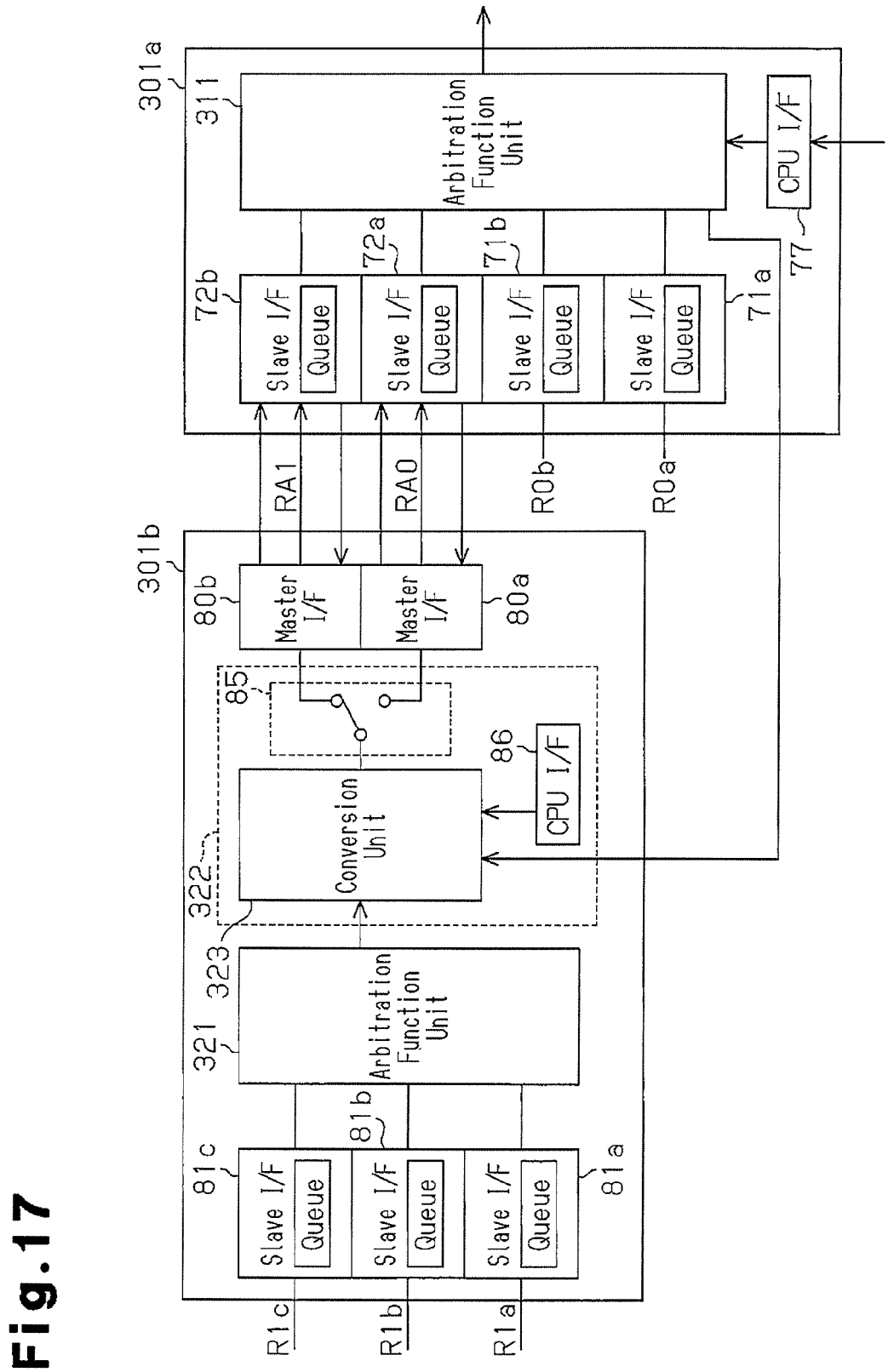

FIG. 1 is a schematic block diagram of an imaging device;

FIG. 2 is a table illustrating operation states of the imaging device;

FIG. 3 is a schematic block diagram of a processor illustrated in FIG. 1;

FIG. 4 is a schematic block diagram of an arbitration circuit illustrated in FIG. 3;

FIG. 5 is a schematic block diagram of arbitration units illustrated in FIG. 3;

FIG. 6 is a flowchart illustrating the operation of the arbitration circuit of FIG. 3;

FIG. 7 is a flowchart illustrating the operation of the arbitration unit of FIG. 3;

FIG. 8 is a schematic block circuit diagram of an arbitration function unit illustrated in FIG. 5;

FIG. 9 is a table illustrating the operation of an inter-level arbitration unit illustrated in FIG. 8;

FIG. 10 is a table illustrating the operation of a channel determination unit illustrated in FIG. 8;

FIG. 11 is a schematic block diagram of an in-level arbitration unit illustrated in FIG. 8;

FIG. 12 is a schematic block diagram of a priority flag generation unit illustrated in FIG. 8;

FIG. 13 is a flowchart illustrating the operation of the in-level arbitration unit of FIG. 8;

FIG. 14 is a flowchart illustrating the operation of the priority flag generation unit of FIG. 8;

FIG. 15 is a schematic block circuit diagram of another arbitration unit;

FIG. 16 is a schematic block circuit diagram of another arbitration unit; and FIG. 17 is a schematic block circuit diagram of another arbitration unit.

DESCRIPTION OF THE EMBODIMENTS

One embodiment will now be described. As illustrated in FIG. 1, an imaging device, which is, for example, a digital still camera, includes an imaging unit 11, a processor 12, an operation unit 13, a memory 14, and a display unit 15. The imaging device further includes a storage unit 16 detachable from the imaging device.

The imaging unit 11 includes an imaging optical system and an image sensor. The imaging optical system includes lenses (a focus lens and the like) that condense light from a subject and an aperture that adjusts the amount of light passing through the lenses. The image sensor is a CCD, a CMOS image sensor, or the like. The image sensor converts incident light into an electrical signal and generates image data for one frame. The imaging unit 11 converts analog image data supplied from the image sensor into digital image data and outputs the digital image data based on a synchronization signal. A synchronization signal includes a vertical synchronization signal indicating the boundaries of one frame and a horizontal synchronization signal indicating the boundaries of one line.

The processor 12 includes a plurality of processing units. Each processing unit accesses the memory 14 in accordance with a specified processing. The memory 14 is, for example, a synchronous dynamic random access memory (SDRAM). The processor 12 outputs to the display unit 15 display data corresponding to data stored in the memory 14. The display unit 15 is, for example, an LCD (a Liquid Crystal Display). Further, the processor 12 outputs to the display unit 15 display data corresponding to image data supplied from the imaging unit 11. The display unit 15 displays an image based on the display data. The display unit 15 functions as an EVF (Electronic View Finder) for checking optical images of a subject captured by the imaging unit 11. Furthermore, based on the operation input by the operation unit 13, the processor 12 outputs to the display unit 15 display data corresponding to image data to be recorded.

The operation unit 13 includes various switches, such as a shutter button and menu button, operable by a user. Alternatively, the operation unit 13 may be a touch panel. In accordance with the operation input by the operation unit 13, the processor 12 stores a photographic mode or a set value such as information required for each processing. The processor 12 processes image data supplied from the imaging unit 11 according to the set value and stores the processed image data (including image data being processed) into the memory 14.

The storage unit 16 is, for example, a memory card. The processing unit 12 stores in the storage unit 16 data (e.g., compressed image data) stored in the memory 14. Further, in accordance with the operation input by the operation unit 13, the processor 12 outputs to the display unit 15 display data corresponding to the data stored in the storage unit 16.

The processor 12 will now be described in detail.

As illustrated in FIG. 3, the processor 12 includes processing units 21a to 21f, 22a and 22b, 23a and 23b, 24a to 24c, and 25a to 25c. Further, the processor 12 includes an arbitration circuit 26, a memory controller 27, clock controllers 28a to 28e, and a central processing unit (CPU) 29. In the description below, the processing units 21a to 21f, 22a and 22b, 23a and 23b, 24a to 24c, and 25a to 25c will be referred to as "processing units 21a to 25c."

The processing units 21a to 25c generate various signals including request signals for accessing the memory 14 in accordance with the processing to be performed. The arbitration circuit 26 arbitrates request signals generated by the processing units 21a to 25c and, in accordance with arbitration results, permits any one of the processing units 21a to 25c to access the memory 14. Further, the arbitration circuit 26 supplies a request signal according to the arbitration results to the memory controller 27. The memory controller 27 outputs control information (commands, addresses, data, etc.), which is transmitted from the processing unit given access permission, to the memory 14 illustrated in FIG. 1. The processing units 21a to 25c access the memory 11 via the memory controller 27 and a bus BL.

An example of the processing performed by the processing units 21a to 25c will now be described. The processing unit 21a, which is a pre-processing unit, subjects image data supplied from the imaging unit 11 to a pre-process such as white balance, and stores the processed data into the memory 14. The processing unit 21b, which is a color processing unit, subjects the image data to a color space conversion processing. The processing unit 21c, which is a distortion correction unit, subjects the image data to a correction processing. The processing unit 21c, for example, corrects image distortion caused by the imaging optical system. The processing unit 21d, which is a resolution conversion unit, performs a processing such as thinning pixel data or interpolating data. The processing unit 21e, which is a face detection unit, detects the position of a faces included in the image data. The processing unit 21f, which is a display unit, converts data read from the memory 11 into display data, and supplies the display data to the display unit 15 illustrated in FIG. 1.

The processing unit 22a, which is a moving image codec, generates moving-image compressed data by using a given system (e.g., MPEG (Moving Picture Experts Group) system). Further, the processing unit 22a generates image data (moving-image data) by expanding the moving-image compressed data. The processing unit 22b, which is an audio processing unit, generates audio compressed data by a given system. In addition, the processing unit 22b generates audio data by expanding the audio compressed data.

The processing unit 23a, which is a still-image codec, generates still-image compressed data by using a given system (e.g., JPEG (Joint Photographic Experts Group) system). Further, the processing unit 23a generates image data (still-image data) by expanding the still-image compressed data. The processing unit 23b, which is a RAW codec, generates RAW data by compressing the image data supplied from the imaging unit 11.

Each of the processing units 24a and 24b, which are card interfaces (I/F), accesses a memory card loaded in the imaging device. The interface form of the processing unit 24a differs from that of the processing unit 24b. The processing unit 24c is a USB (Universal Serial Bus) interface.

The processing unit 25a, which is a noise removal unit, removes noise by subjecting data read from the memory 14 to a given processing, and stores the processed data into the memory 11. The processing unit 25b, which is a high DR (Dynamic Range) processing unit, generates image data that has an extended luminance range. The processing unit 25c, which is an image-display-effect processing unit, subjects the image data to a processing such as border enhancement.

The arbitration circuit 26 includes a plurality of (for example, five in FIG. 3) arbitration units 26a to 26e. The processing units 21a to 21f are coupled to the arbitration unit 26a. The processing units 22a and 22b are coupled to the arbitration unit 26b. The processing units 23a and 23b are coupled to the arbitration unit 26c. The processing units 24a to 24c are coupled to the arbitration unit 26d. The processing units 25a to 25c are coupled to the arbitration unit 26e. The arbitration units 26b to 26e are coupled to the arbitration unit 26a. Each of the arbitration units 26b to 26e is an example of a first arbitration unit, and the arbitration unit 26a is an example of a second arbitration unit.

The arbitration unit 26b arbitrates request signals from the processing units 22a and 22b, and transmits request signals corresponding to the results of arbitrations to the arbitration unit 26a. The arbitration unit 26c arbitrates request signals from the processing units 23a and 23b, and transmits request signals corresponding to the results of arbitrations to the arbitration unit 26a. The arbitration unit 26d arbitrates request signals from the processing units 24a to 24c, and transmits request signals corresponding to the results of arbitrations to the arbitration unit 26a. The arbitration unit 26e arbitrates request signals from the processing units 25a to 25c, and transmits request signals corresponding to the results of arbitrations to the arbitration unit 26a. The arbitration unit 26a arbitrates request signals from the processing units 21a to 21f and request signals from the arbitration units 26b to 26e, and transmits request signals corresponding to the results of arbitrations to a memory controller 27. Each of the request signals output from the corresponding arbitration units, 26b to 26e, is an example of a first arbitration signal, and each of the request signals output from the arbitration unit 26a is an example of a second arbitration signal.

The arbitration unit 26a receives request signals from the arbitration units 26b to 26e, and also receives request signals from the processing units 21a to 21f directly coupled to the arbitration unit 26a. Therefore, processing of requests from the processing units 21a to 21f directly coupled to the arbitration unit 26a is given priority over processing of requests from the processing units 22a to 25c directly coupled to the arbitration units 26b to 26e.

The processing units 21a to 25c and the arbitration units 26a to 26e operate based on clock signals CK1 to CK5 generated by the clock controllers 28a to 28e. The clock controller 28a generates a clock signal CK1 of a given frequency by performing an oscillating operation. The clock signal CK1 is supplied to the arbitration unit 26a and processing units 21a to 21f corresponding to the clock controller 28a. When accessing the memory 14 and processing image data, each of the processing units 21a to 21f outputs a request signal in synchronization with the clock signal CK1. The arbitration unit 26a performs request signal arbitration, output of request signals to the memory controller 27, and access permission, etc., in synchronization with the clock signal CK1.

The clock controllers 28b to 28e generate clock signals CK2 to CK5 of a given frequency, respectively, by performing oscillating operations. The frequency of each of the clock signals CK2 to CK5 is equal to the frequency of the clock signal CK1. The clock controllers 28b to 28e supply or stop clock signals CK2 to CK5 in accordance with information set by the CPU 29. For example, each of the clock controllers 28b to 28e includes a resistor (not illustrated) that stores a set value. The CPU 29 is an example of a control unit, and a set value stored in the register is an example of control information. The CPU 29 stores set values corresponding to the operation states of the imaging device into the registers of the clock controllers 28b to 28e. The clock controllers 28b to 28e supply or stop clock signals CK2 to CK5 in accordance with the set values in the corresponding registers. Alternatively, in accordance with the set values in the registers, the clock controllers 28b to 28e stop the generation of clock signals CK2 to CK5, that is, they may stop oscillating operations.

The clock signal CK2 generated by the clock controller 28b is supplied to the processing units 22a and 22b and arbitration unit 26b corresponding to the clock controller 28b. When accessing the memory 14 and processing image data, each of the processing units 22a and 22b outputs a request signal in synchronization with the clock signal CK2. The arbitration unit 26b performs request signal arbitration, output of request signals to the arbitration unit 26a, and access permission, etc., in synchronization with the clock signal CK2.

Similarly, the clock signal CK3 generated by the clock controller 28c is supplied to the processing units 23a and 23b and arbitration unit 26c corresponding to the clock controller 28c. When accessing the memory 14 and processing image data, each of the processing units 23a and 23b outputs a request signal in synchronization with the clock signal CK3. The arbitration unit 26c performs request signal arbitration, output of request signals to the arbitration unit 26a, and access permission, etc., in synchronization with the clock signal CK3.

Similarly, the clock signal CK4 generated by the clock controller 28d is supplied to the processing units 24a to 24c and arbitration unit 26d corresponding to the clock controller 28d. When accessing the memory 14 and processing image data, each of the processing units 24a to 24c outputs a request signal in synchronization with the clock signal CK4. The arbitration unit 26d performs request signal arbitration, output of request signals to the arbitration unit 26a, and access permission, etc., in synchronization with the clock signal CK4.

Similarly, the clock signal CK5 generated by the clock controller 28e is supplied to the processing units 25a to 25c and arbitration unit 26e corresponding to the clock controller 28e. When accessing the memory 14 and processing image data, each of the processing units 25a to 25c outputs a request signal in synchronization with the clock signal CK5. The arbitration unit 26e performs request signal arbitration, output of request signals to the arbitration unit 26a, and access permission, etc., in synchronization with the clock signal CK5.

Each of the processing units 21a to 25c that output request signals to the arbitration circuit 26 is called a bus master. The memory controller 27 that receives request signals from the arbitration circuit 26 is called a bus slave. Each of the arbitration units 26a to 26e includes an interface circuit arranged on the bus master side and called a slave interface (slave I/F), and an interface circuit arranged on the bus slave side and called a master interface (master I/F).

The CPU 29 supplies request signals for accessing the memory 11 illustrated in FIG. 1 to the arbitration unit 26a. Therefore, the arbitration unit 26a recognizes the CPU 29 as a processing unit.

The CPU 29 sets operation of the imaging device in accordance with operation of the operation unit 13 illustrated in FIG. 1. In addition, the CPU 29 controls the processing units 21a to 25c and clock controllers 28a to 28e in accordance with operation of the imaging device. For example, as illustrated in FIG. 2, operations of the imaging device include live view, still-image photographing, moving-image photographing, high image quality still-image photographing, still-image reproduction, moving-image reproduction, and slide show reproduction. Processing units used in corresponding operations of the imaging device differ from one another, and the arbitration units 26a to 26e are coupled to the processing units corresponding to the operations (i.e., processing to be performed) of the imaging device. In FIG. 2, arbitration unit [2] includes the arbitration unit 26b illustrated in FIG. 3 and processing units 22a and 22b coupled to the arbitration unit 26b. An arbitration unit [3] includes the arbitration unit 26c and the processing units 23a and 23b coupled to the arbitration unit 26c. An arbitration unit [4] includes the arbitration unit 26d and the processing units 24a to 24c coupled to the arbitration unit 26d. An arbitration unit [5] includes the arbitration unit 26e and the processing units 25a to 25c coupled to the arbitration unit 26e.

For example, the frequency of the performance of the processing by the processing units 21a to 21f is greater than that by the processing units 22a to 25c. Thus, the processing units 21a to 21f are coupled to the arbitration unit 25a directly. The processing units 22a and 22b that frequently perform processing simultaneously are coupled to the arbitration unit 26b. The processing units 23a and 23b that may perform process simultaneously are coupled to the arbitration unit 26c. The processing units 24a to 24c that frequently perform processing independently are coupled to the arbitration unit 26d. The processing units 25a to 25c that perform processing exclusively or simultaneously based on image characteristics or user instructions are coupled to the arbitration unit 26e.

The processing unit 22a coupled to the arbitration unit 26b is a moving-image codec. The processing unit 22a may perform image data input and code data output simultaneously in an imaging operation. Further, the processing unit 22a may perform code data input and image data output simultaneously in a reproducing operation. Accordingly, the processing unit 22a may output a request signal corresponding to an input operation and a request signal corresponding to an output operation simultaneously. When the processing unit 22a performs an input operation and an output operation simultaneously, the arbitration unit 26b outputs two request signals to the arbitration unit 26a.

Each of the processing units 23a and 23b coupled to the arbitration unit 26c is a still-image codec. In the same manner as the processing unit 22a, each of the processing units 23a and 23b may carry out pre-processed data input and processed data output simultaneously. When each of the processing units 23a and 23b outputs a request signal corresponding to an input operation and a request signal corresponding to an output operation, the arbitration unit 26c outputs two request signals to the arbitration unit 26a.

Similarly, the processing units 24a to 24c coupled to the arbitration unit 26d may access the memory 14 simultaneously. Similarly, the processing units 25a to 25c coupled to the arbitration unit 26e may access the memory 14 simultaneously. Therefore, each of the arbitration units 26d and 26e outputs two request signals to the arbitration unit 26a so that the access may be performed at the same time.

The CPU 29 controls the clock controllers 28b to 28e so as to stop supply of clock signals to the processing units not used in the current operation of the imaging device. For example, the CPU 29 stores set values corresponding to the operations of the imaging device into the respective registers of the clock controllers 28b to 28e. The clock controllers 28b to 28e supply or stop the clock signals CK2 to CK5 in accordance with the corresponding set values.

Processing units not supplied with clock signals do not operate. The clock signals CK2 to CK5 from the clock controllers 28b to 28e are supplied to the arbitration units 26b to 26e respectively. Arbitration units not supplied with clock signals do not operate. The CPU 29 supplies clock signals to processing and arbitration units corresponding to the current operation and operates them. In other words, the CPU 29 stops supply of clock signals to processing and arbitration units not corresponding to the current operation. Thus, power consumed by the processor 12 is reduced.

Further, the CPU 29 sets signal selection information corresponding to the current operation of the imaging device, for arbitration units 26a to 26e. The orders of priority of the processing performed by the corresponding processing units 21a to 25c differ from one another in accordance with operation of the imaging device. Based on signal selection information, the CPU 29 sets the orders of priority of the processing performed by the corresponding processing units. Therefore, each of the arbitration units 26a to 26e arbitrates request signals from the processing units in accordance with the priority order set by the signal selection information.

Next, supply of the clock signals will now be described. As illustrated in FIG. 4, the clock signal CK1 generated by the clock controller 28a is supplied to the arbitration unit 26a of the arbitration circuit 26 and the processing units 21a and 21b via a signal transmission unit 31a. The signal transmission unit 31a includes at least one clock buffer 32a and wires provided to transmit clock signal CK1. The numbers of the clock buffers 32a arranged between the clock controller 28a and the arbitration unit 26a, between the clock controller 28a and the processing unit 21a, and between the clock controller 28a and the processing unit 21b, are set in accordance with the respective transmitting paths such that the clock signals CK1 change at the arbitration unit 26a and the processing units 21a and 21b at the same timing.

The processing unit 21a includes a register 41a, a switch 42a, and an internal circuit 43a. The CPU 29 stores a set value (setting information) corresponding to operation of the imaging device in the register 41a. The switch 42a is turned on and off in accordance with a set value stored in the register 41a. The clock signal CU is supplied to the internal circuit 43a when the switch 42a is turned on. That is, the clock signal CK1 is not supplied to the internal circuit 43a when the switch 42a is turned off. Accordingly, the processing unit 21a operates or stops in accordance with a value set in the register 41a.

In the same manner as the processing unit 21a, the processing unit 21b includes a register 41b, switch 42b, and internal circuit 43b. The switch 42b is turned on and off in accordance with a set value stored in the register 41b. When the switch 42b is turned on, the clock signal CK1 is supplied to the internal circuit 43b via the switch 42b. Accordingly, the processing unit 21b operates or stops in accordance with a value set in the register 41b.

The configurations of the processing units 21c to 21f illustrated in FIG. 3 are the same as those of the processing units 21a and 21b illustrated in FIG. 4 and, therefore, supply or stop of the clock signal CK1 to each of the processing units 21c to 21f is controlled in the same manner. Therefore, the processing units 21c to 21f are not illustrated in FIG. 4.

The clock controller 28b includes a register 61 and switch 62. The register 61 stores a value set by the CPU 29 in accordance with operation of the imaging device. The switch 62 is turned on and off in accordance with the value set in the register 61. When the switch 62 is turned on, the clock controller 28b outputs a clock signal CK2. That is, when the switch 62 is turned off, the output of the clock signal CK2 is stopped.

The clock signal CK2 is supplied to the processing units 22a and 22b and arbitration unit 26b via a signal transmission unit 31b. The signal transmission unit 31b includes at least one clock buffer 32b and wires provided to transmit a clock signal CK2. The numbers of the clock buffers 32b arranged between the clock controller 28b and the arbitration unit 26b, between the clock controller 28b and the processing unit 22a, and between the clock controller 28b and the processing unit 22b, are set in accordance with the respective transmitting paths such that the clock signals CK2 change at the arbitration unit 26b and the processing units 22a and 22b at the same timing.

In the same manner as the processing units 21a and 21b, the processing unit 22a includes a register 51a, switch 52a, and internal circuit 53a. The switch 52a is turned on and off in accordance with a value set in the register 51a. When the switch 52a is turned on, the clock signal CK2 is supplied to the internal circuit 53a. Thus, the processing unit 22a operates or stops in accordance with a value set in the register 51a.

In the same manner as the processing units 22a, the processing unit 22b includes a register 51b, switch 52b, and internal circuit 53b. The switch 52b is turned on and off in accordance with a value set in the register 51b. When the switch 52b is turned on, the clock signal CK2 is supplied to the internal circuit 53b. Thus, the processing unit 22b operates or stops in accordance with a value set in the register 51b.

The clock signals CK3 to CK5 generated by the clock controllers 28c to 28e illustrated in FIG. 3 are supplied to the processing units 23a to 25c and the arbitration units 26c to 26e via signal transmission units similar to the signal transmission units 31a and 31b illustrated in FIG. 4.

When the clock signal CK2 stops in the signal transmission unit 31b, the clock buffers 32b included in the signal transmission unit 31b come to rest. For example, when the clock buffer 32b has a CMOS structure, power consumption in the stationary clock buffers 32b is almost zero. Therefore, by stopping a clock signal CK2, power consumption in the signal transmission unit 31b is reduced compared to when a clock signal CK2 is supplied. Similarly, power consumption is reduced in signal transmission units that supply the clock signals CK3 to CK5 from the clock controllers 28c to 28e to the processing units 23a to 25c and the arbitration units 26c to 26e.

In the same manner as the processing units 22a and 22b illustrated in FIG. 4, the processing units 23a to 25c illustrated in FIG. 3 include switches that are turned on and off in accordance with values set in their corresponding registers. Accordingly, the clock signals CK3 to CK5 are supplied to their corresponding internal circuits when the corresponding switches are turned on. Thus, the processing units 23a to 25c operate or stop in accordance with values set in the corresponding registers. The values for the corresponding processing units 21a to 25c are set by the CPU 29. Therefore, the CPU 29 controls operation of each of the processing units 21a to 25c. Thus, while the CPU 29 operates processing units required for operation of the imaging device, it stops processing units not required for operation.

The arbitration unit 26b includes a plurality of (two in FIG. 4) master interfaces (master I/F) 80a and 80b and a plurality of (three in FIG. 4) slave interfaces (slave i/F) 81a to 81c. The master interfaces 80a and 80b are coupled to the arbitration unit 26a. The slave interfaces 81a and 81b are coupled to the processing unit 22a, and the slave interface 81c is coupled to the processing unit 22b. Based on the clock signal CK2, the arbitration unit 26b receives two request signals output from the processing unit 22a, and one request signal output from the processing unit 22b. Then, the arbitration unit 26b arbitrates the request signals from the processing units 22a and 22b, and outputs to the arbitration unit 26a two request signals corresponding to the arbitration results.

The arbitration unit 26a includes a master interface 70 and a plurality of (two in FIG. 4) slave interfaces 71a and 71b. The master interface 70 is coupled to the memory controller 27. The slave interfaces 71a and 71b are coupled to the processing units 21a and 21b respectively. Although, not illustrated in FIG. 4, the arbitration unit 26a also includes slave interfaces coupled to the processing units 21c to 21f illustrated in FIG. 3.

Further, the arbitration unit 26a includes a plurality of (two in FIG. 4) slave interfaces 72a and 72b. The slave interfaces 72a and 72b are coupled to the master interfaces 80a and 80b, respectively, of the arbitration unit 26b. The slave interfaces 72a and 72b operate based on the clock signal CK2. Therefore, when the clock signal CK2 is not supplied, the slave interfaces 72a and 72b stop. Thus, power consumption in the arbitration unit 26a is reduced.

Although not illustrated in FIG. 4, the arbitration unit 26a includes slave interfaces coupled to the master interfaces of the arbitration units 26c to 26e illustrated in FIG. 3. The clock signal CK3 is supplied to the slave interface coupled to the arbitration unit 26c. Similarly, the clock signal CK4 is supplied to the slave interface coupled to the arbitration unit 26d; and the clock signal CK5, to the slave interface coupled to the arbitration unit 26e. The arbitration units 26c to 26e operate based on the clock signals CK3 to CK5 respectively. Accordingly, when supply of the clock signals CK3 to CK5 is stopped, operation of the slave interfaces coupled to the arbitration units 26c to 26e stops. Thus, power consumption in the arbitration units 26c to 26e is reduced.

Next, an example of the arbitration units 26a and 26b will now be described. As illustrated in FIG. 5, the arbitration unit 26b includes the master interfaces 80a and 80b described above, the slave interfaces 81a to 81c described above, an arbitration function unit 82, and an interface selection unit 83.

Each of the slave interfaces 81a to 81c includes a queue. The slave interface 81a stores request signals output from the processing unit 22a illustrated in FIG. 4 into the queue, and outputs the queue having that order of storages. Similarly, the slave interfaces 81b and 81c store request signals output from the processing units 22a and 22b, respectively, into the corresponding queues, and output the queues with corresponding orders of storage.

The arbitration function unit 82 receives a plurality of request signals (three in the present embodiment), that is, request signals output from the slave interfaces 81a to 81c. A plurality of priority levels have been set in the arbitration function unit 82, and at least one channel number is set for each priority level. Each channel number is set for a request signal supplied to the arbitration function unit 82. For instance, two priority levels are set in the arbitration function unit 82, and a channel number corresponding to at least one of the request signals is set for each priority level. This channel number is set as signal selection information.

Using a round-robin method, the arbitration function unit 82 arbitrates requests that contend between channel numbers set in each priority level, Further, the arbitration function unit 82 arbitrates requests that contend between channel numbers selected in different levels. For the inter-level arbitration, the number of times that selections are made is set in the arbitration function unit 82. The number of times that selections are made is set in accordance with the priority of each level. For example, the number of times that selections are made is set lower for a level with a low priority than for a level with a high priority.

The arbitration function unit 82 sequentially selects channel numbers set for a high level, that is, a level with high priority. The arbitration function unit 82 selects channel numbers set for a high level the number of times set for the high level, and then selects channel numbers set for a low level the number of times set for the low level. In this manner, in accordance with the number of times that selection is made, which is set for each level of priority, the arbitration function unit 82 selects channel numbers for each level of priority, that is, request signals and outputs the request signals. Therefore, even when there are many request signals with high levels of priority, the arbitration function unit 82 selects a request signal with a low level of priority at a given rate. Then, the arbitration function unit 82 outputs the request signal selected, together with the number (master number) of the processing unit that has output the selected request signal.

The interface selection unit 83 includes a conversion unit 84, a switching unit 85, and a CPU interface (CPU I/F) 86. The CPU interface 86 is coupled to the CPU 29 illustrated in FIG. 3.

Although not illustrated in FIG. 4, the processing unit 22a includes a master interface coupled to the slave interface 81a and another master interface coupled to the slave interface 81b. Similarly, the processing unit 22b includes a master interface coupled to the slave interface 81c. The CPU 29 associates the master numbers of the corresponding master interfaces of the processing units 22a and 22b with the interface number of the master interface 80a or 80b, and sets the associated master numbers and interface numbers in the conversion unit 84.

In the present embodiment, the master number of the master interface of the processing unit 22a coupled to the slave interface 81a and the interface number of the master interface 80a are associated with each other and set in the conversion unit 84. Further, the master number of the master interface of the processing unit 22a coupled to the slave interface 81b and the interface number of the master interface 80b are associated with each other and set in the conversion unit 84. Further, the master number of the master interface of the processing unit 22b coupled to the slave interface 81c and the interface number of the master interface 80b are associated with each other and set in the conversion unit 84.

The conversion unit 84 converts a master number corresponding to a request signal, selected by the arbitration function unit 82, into a master interface number associated with the master number.

The switching unit 85 connects a master interface corresponding to a master interface number to a conversion unit 84. Consequently, the interface selection unit 83 outputs a request signal selected by the arbitration function unit 82, to the master interface of an interface number set for the processing unit that has output the request signal. Further, the interface selection unit 83 outputs a master number corresponding to the request signal selected by the arbitration function unit 82 to the master interface as an identification number (ID number).

Therefore, one of the two request signals output from the processing unit 22a illustrated in FIG. 4 is output from the master interface 80a; and the other, from the master interface 80b. A request signal output from the processing unit 22b illustrated in FIG. 4 is also output from the master interface 80b.

The arbitration unit 26a includes slave interfaces 71a, 71b, 72a, and 72b, an arbitration function unit 76, and a CPU interface (CPU I/F) 77. In FIG. 5, the processing units 21c to 21f illustrated in FIG. 3, slave interfaces corresponding to the arbitration units 26c to 26e, and the master interface 70 illustrated in FIG. 4, are not illustrated.

Each of the slave interfaces 71a to 72b includes a queue. The slave interface 71a stores request signals output from the processing unit 21a illustrated in FIG. 4 into the queue, and outputs the queue with that order of storage. Similarly, the slave interface 71b stores request signals output from the processing unit 21b into the queue, and outputs the queue with that order of storage. Similarly, the slave interfaces 72a and 72b store request signals output from the arbitration units 26b into the corresponding queues, and output the queues with corresponding orders of storage.

The arbitration function unit 76 receives a plurality of request signals (four in the present embodiment), that is, request signals output from the slave interfaces 71a to 72b. A plurality of levels of priority are set in the arbitration function unit 76, and at least one channel number is set for each level of priority. Each channel number is set for a request signal input to the arbitration function unit 76. For instance, three levels of priority are set in the arbitration function unit 76, and a channel number corresponding to at least one of the request signals is set for each level of priority. This channel number is set as signal selection information.

Using a round-robin method, the arbitration function unit 76 arbitrates requests that contend between channel numbers set in each priority level. Further, the arbitration function unit 76 arbitrates requests that contend that channel numbers selected in difference levels. For the inter-level arbitration, the number of times that selections are made is set in the arbitration function unit 76. The number of times that selections are made is set in accordance with the priority of each level. For example, the number of times that selections are made is set lower for a level with a low priority than for a level with a high priority.

The arbitration function unit 76 sequentially selects channel numbers set for a high level, that is, a level with a high priority. The arbitration function unit 76 selects channel numbers set for a high level the number of times set for the high level, and then selects channel numbers set for a low level the number of times set for the low level. In this manner, in accordance with the number of times that selection is made, which is set for each level of priority, the arbitration function unit 76 selects channel numbers for each priority level, that is, request signals. Therefore, even when there are many request signals with high levels of priority, the arbitration function unit 76 selects request signals with low levels of priority at a given rate.

Thus, a request signal with a low level of priority is selected at a given rate, and the processing unit that outputs the request signal may obtain a right to access the memory 14, that is, the right to use a common bus coupled to the memory 14.

After the arbitration function unit 76 selects a request signal, it sends a reception signal, as a reply, to the slave interface that has output the request signal. Further, the arbitration function unit 76 outputs the request signal selected to the memory controller 27. For instance, when the arbitration function unit 76 selects a request signal output from the slave interface 71a, it sends a reception signal, as a reply, to the slave interface 71a. This reception signal is transmitted to the processing unit 21a illustrated in FIG. 3 via the arbitration unit 26b. Based on the reception signal, the processing unit 21a accesses the memory 14 via the bus BL and the memory controller 27.

When the arbitration function unit 76 selects a request signal output from the slave interface 72a, a reception signal, as a reply, is sent to the arbitration unit 26b via the slave interface 72a. The arbitration unit 26b receives a reception signal from the master interface 80a, and sends the reception signal, via the corresponding slave interface, to the processing unit 22a (FIG. 3) that has the master number associated with the interface number of the master interface 80a. Based on the reception signal, the processing unit 22a accesses the memory 14 via the bus BL and the memory controller 27.

Next, the processing of stopping a clock signal will now be described.

A description will be given using, as an example, the processing of stopping supply of clock signals CK2 to the processing units 22a and 22b and the arbitration unit 26b illustrated in FIG. 3.

As illustrated in FIG. 6, in step 101, the CPU 29 determines whether the processing units 22a and 22b and the arbitration unit 26b have changed to inactive mode or not. For instance, in FIG. 2, when the operating mode of the imaging device is changed from a moving-image photographic mode (moving-image mode) to a still-image photographic mode (still-image mode), the processing units 22a and 22b coupled to an arbitration unit [2], namely, with the arbitration unit 26b illustrated in FIG. 3 are rendered inactive. When the processing units 22a and 22b and arbitration unit 26 change to inactive mode, the CPU 29 proceeds to step 102.

In step 102, the CPU 29 checks the operation state of a bus master coupled to the arbitration unit 26b. That is, the CPU 29 checks the operation states of the processing units 22a and 22b coupled to the arbitration unit 26b. The operation states of the processing units 22a and 22b are determined by an interruption signal, or the like, based on termination of the respective processing of the processing units 22a and 22b or termination of transfer. Then, in step 103, the CPU 29 determines whether all the bus masters, namely, the processing units 22a and 22b have terminated the respective processing or not. When the processes of the processing units 22a and 22b have not yet been terminated, the CPU 29 rechecks the operation states of the processing units 22a and 22b in step 102. When the processing of the processing units 22a and 22b is terminated, the CPU 29 proceeds to step 104.

In step 104, the CPU 29 instructs the arbitration unit 26a to perform a configuration modification. That is, the CPU 29 sets configuration information, including an order of priority, in the arbitration function unit 76 of FIG. 5.

Next, in step 105, using a mask signal, the arbitration unit 26a suspends reception of request signals from slave interfaces.

Next, in step 106, the arbitration unit 26a determines whether transfer of data corresponding to an issued request signal is terminated or not. When data transfer has not yet been terminated, the determination processing in step 106 is repeated until data transfer is terminated. Upon termination of the data transfer, the arbitration unit 26a proceeds to step 107.

The arbitration unit 26a checks the processing associated with a request signal issued to the memory controller 27 which is a bus slave. That is, the arbitration unit 26a checks transfer between the bus master and the bus slave. Upon determining that the transfer of data associated with the last request signal issued to the memory controller 27 is terminated, the arbitration unit 26a transmits, for example, an interruption signal to the CPU 29 in step 107, thereby informing the CPU 29 that the configuration may be modified. An interruption signal to the CPU 29 is an example of a configuration modifiable signal.

Next, in step 108, the CPU 29 instructs the clock controller 28b to stop the supply of clock signals CK2 to the arbitration unit 26b and to the processing units 22a and 22b coupled to the arbitration unit 26b. The CPU 29 stores a set value indicating clock stop in the register 61 of the clock controller 28b. As illustrated in FIG. 4, the switch 62 of the clock controller 28b is turned off in accordance with a value set in the register 61. Therefore, the output of the clock signal CK2 is stopped. Further, the CPU 29 stores set values indicating operation stop in the registers 51a and 51b of the processing units 22a and 22b, respectively. The switches 52a and 52b are turned off in accordance with the values set in the registers 51a and 51b.

Next, in step 109, the arbitration unit 26a modifies the configuration in accordance with configuration information set by the CPU 29. For example, the arbitration unit 26a cancels the order of priority assigned to bus masters (the processing units 22a and 22b) coupled to the arbitration unit 26b, and assigns an order of priority corresponding to the operation mode, to another bus master continuing the operation.

Next, in step 110, the arbitration unit 26a cancels the mask provided for request signals, and resumes the reception of request signals from slave interfaces.

Next, the processing of supplying clock signals will now be described. Here, a description will be given using, as an example, the processing of supplying the clock signals CK2 to the processing units 22a and 22b and the arbitration units 26b illustrated in FIG. 3.

As illustrated in FIG. 7, in step 111, the CPU 29 determines whether the processing units 22a and 22b and arbitration unit 26b have changed to an active mode or not. For instance, in FIG. 2, when the operating mode of the imaging device is changed from still-image photographic mode (still-image mode) to moving-image photographic mode (moving-image mode), the processing units 22a and 22b coupled to the arbitration unit [2], namely, with the arbitration unit 26b illustrated in FIG. 3 is rendered active. When the processing units 22a and 22b and arbitration unit 26 change to the active mode, the CPU 29 proceeds to step 112.

In step 112, the CPU 29 instructs the arbitration unit 26a to perform a configuration modification. That is, the CPU 29 sets configuration information, including an order of priority, in the arbitration function unit 76 of FIG. 5.

Next, in step 113, using a mask signal, the arbitration unit 26a suspends reception of request signals from the slave interfaces.

Next, in step 114, the arbitration unit 26a determines whether transfer of data corresponding to an issued request signal is terminated or not. When the data transfer has not yet been terminated, the determination processing in step 114 is repeated until data transfer is terminated. When the data transfer is terminated, the arbitration unit 26a proceeds to step 115. In step 115, the arbitration unit 26a transmits, for example, an interruption signal to the CPU 29, thereby informing the CPU 29 that the configuration may be modified.

Next, in step 116, the CPU 29 instructs the clock controller 28b to supply the clock signals CK2 to the arbitration unit 26b and the processing units 22a and 22b coupled to the arbitration unit 26b. The CPU 29 stores set values indicating clock signal supply in the register 61 (see FIG. 4) of the clock controller 28b. The switch 62 of the clock controller 28b is turned on in accordance with the values set in the register 61. Consequently, the clock signals CK2 are supplied to the arbitration unit 26b and the processing units 22a and 22b.

Next, in step 117, the arbitration unit 26a modifies configuration in accordance with the configuration information set by the CPU 29. For example, the arbitration unit 26a assigns order of priority to the bus masters (the processing units 22a and 22b) coupled to the arbitration unit 26b according to the configuration information. Next, in step 118, the arbitration unit 26a cancels, for example, the mask provided for the request signals, and resumes reception of request signals from the slave interfaces.

Next, in step 119, the CPU 29 activates the processing units 22a and 22b coupled to the arbitration unit 26b. The CPU 29 stores set values indicating operating permission in the registers 51a and 51b of the processing units 22a and 22b illustrated in FIG. 4. The switches 52a and 52b are turned on in accordance with the values set in registers 51a and 51b.

Consequently, the internal circuits 53a and 53b operate based on the clock signals CK2.

As described above, the control illustrated in FIGS. 6 and 7 is exerted for the processing units 22a and 22b and the arbitration unit 26b. In the same manner, the CPU 29 controls the other processing units and arbitration units in accordance with the operation state.

Next, an example of the arbitration function unit of each of the arbitration units 26a to 26e will now be described.

FIG. 8 illustrates an example of the arbitration function unit 76 (see FIG. 5) of the arbitration unit 26a. Below is a description of the arbitration function unit corresponding to seven request signals W0 to W6.

As illustrated in FIG. 8, the arbitration function unit 76 includes a plurality of (three in FIG. 8) in-level arbitration unit 151a to 151c. The in-level arbitration units correspond to set levels of priority. For instance, the in-level arbitration unit 151a is set as a first priority, that is, the highest priority; the in-level arbitration unit 151b, as a second priority; and the in-level arbitration unit 151c, as a third priority, that is the lowest priority.

Each of the in-level arbitration units 151a to 151c receives the request signals W0 to W6. Enabling signals ENa1 to Enc1 are supplied to the in-level arbitration units 151a to 151c. The enabling signals ENa1 to ENc1 indicate whether the right to use the bus is set for channel numbers output from the in-level arbitration units 151a to 151c. When the right to use the bus for the channel number is set, the in-level arbitration units 151a to 151c modify priority based on the enabling signals ENa1 to ENc1 by using a given method (a round-robin method in the present embodiment).

Signal selection information is stored in each of the in-level arbitration units 151a to 151c. The signal selection information includes at least one channel number. The signal selection information includes information indicating an arbitration priority set for each of the in-level arbitration units 151a to 151c. The in-level arbitration units 151a to 151c arbitrate request signals corresponding to channel numbers, and generate effective signals SE1 to SE3 indicating the presence or absence of a request. The in-level arbitration units 151a to 151c respond to the enabling signals (set signals), and output channel numbers corresponding to arbitration results. Further, the in-level arbitration units 151a to 151c modify the priority for each item of signal selection information based on the enabling signals ENa1 to ENc1.

The arbitration function unit 76 includes priority flag generation units 152a and 152b corresponding to different levels of priority. When request signals contend with each other, each of the priority flag generation units 152a and 152b generates a priority flag indicating that a request signal at the corresponding level of priority is given priority or indicating that a request signal at another level is given priority. When the lowest level is given priority, a request signal at the lowest level is automatically selected. Accordingly, the priority flag generation units are provided in correspondence with the levels of priority other than the lowest one.

The priority flag generation unit 152a receives enabling signals ENa1 and ENa2. The enabling signal ENa1 indicates whether the right to use the bus is set for a request (signal, channel number) at a level of priority (first level) corresponding to the priority flag generation unit 152a. The enabling signal ENa2 indicates whether the right to use the bus is set for a request (signal, channel number) at another level of priority. That is, the priority flag generation unit 152a confirms through the enabling signal ENa1 that the right to use the bus is set for a channel number at the first level of priority and confirms through the enabling signal ENa2 that the right to use the bus is set for a channel number at another priority level. The level of priority (first level) of the priority flag generation unit 152a corresponds to the highest level. Accordingly, the priority flag generation unit 152a determines whether the right to use the bus is set for the channel number corresponding to the highest or first level of priority, and also determines whether the right to use the bus is set for the channel number corresponding to a level of priority lower than the first priority level. The priority flag generation unit 152a has a counting function that counts the number of times the right to use the bus has been set. The priority flag generation unit 152a generates a priority flag SP1 based on a count value.

The priority flag SP1 is, for example, a binary signal. When the priority flag SP1 has a first value (e.g., 0), the channel number of the highest or first level is given priority. When the priority flag SP1 has a second value (e.g., 1), a channel number of another level is given priority.

In the same manner as the priority flag generation unit 152a, the priority flag generation unit 152b receives enabling signals ENb1 and ENb2. The enabling signal ENb1 indicates whether the right to use the bus is set for a request (signal, channel number) of a second level of priority corresponding to the priority flag generation unit 152b. The enabling signal ENb2 indicates whether the right to use the bus is set for a request (signal, channel number) of another level of priority. The priority flag generation unit 152b generates a priority flag SP2 based on the enabling signals ENb1 and ENb2.

As described above, the priority flag generation unit 152a generates the priority flag SP1 indicating that the highest, first level is given priority or that another level (a level lower than the first level of priority) is given priority. Similarly, the priority flag generation unit 152b generates the priority flag SP2 indicating that the second level is given priority or that another level is given priority. When the highest, first level is given priority, it is indicated by the enabling signal ENa1. Therefore, the priority flag SP2 indicates that the second level below the first level is given priority or that a lower level below the second level is given priority.

The arbitration function unit 76 includes inter-level arbitration units 153a and 153b corresponding to different levels of priority (the first and second levels in the present embodiment).

The inter-level arbitration unit 153a receives an effective signal SE1 from the in-level arbitration unit 151a, a priority flag SP1 from the priority flag generation unit 152a, and an output signal SE21 from an OR circuit 155. The OR circuit 155 receives an effective signal SE2 from the in-level arbitration unit 151b and an effective signal SE3 from the in-level arbitration unit 151c. The OR circuit 155 performs the OR calculation of the effective signals SE2 and SE3 to generate a combination signal (effective signal) SE21. The combination signal SE21 indicates that an effective request signal is supplied to at least one of the in-level arbitration units 151b and 151c. That is, the combination signal SE21 indicates that an effective request signal is present at a level of priority lower than the first level of priority corresponding to the inter-level arbitration unit 153a.

When one of the effective signals SE1 and SE2 indicates an effective request, the inter-level arbitration unit 153a outputs, as an inter-level arbitration signal SA1, an effective signal indicating the effective request. When both the effective signals SE1 and SE2 indicate effective requests, that is, when the effective signals SE1 and SE2 contend with each other, the inter-level arbitration unit 153a outputs, as an inter-level arbitration signal SA1, one of the effective signals SE1 and SE2 in accordance with the priority flag SP1. That is, in accordance with the priority flag SP1, the inter-level arbitration unit 153a selects the effective signal SE1 that gives its own level of priority (the first level of priority) or the effective signal SE2 that gives another level of priority.

FIG. 9 is a diagram explaining the operation of the inter-level arbitration unit 153a. In FIG. 9, "priority flag" indicates a priority flag SP1 output from the priority flag generation unit 152a, "Effective signal 1" indicates an effective signal SE1 output from the in-level arbitration unit 151a. "Effective signal 2" indicates an effective signal SE2 output from the in-level arbitration unit 151b. "Priority flag" with "0" indicates that a higher level is given priority. "Priority flag" with "1" indicates that a lower level is given priority. "Effective signal 1" with "1" and "effective signal 2" with "1" each indicate that a request from a set DMA channel (processing unit) is present, "Effective signal 1" with "0" and "effective signal 2" with "0" each indicates that a request is not present.

Therefore, in a case where both "effective signal 1" and "effective signal 2" are "1," this case indicates that two priority levels contend with each other. In this case, the inter-level arbitration unit 153a selects "effective signal 1" in accordance with priority flag "0" and selects "effective signal 2" in accordance with priority flag "1."

Similarly, the inter-level arbitration unit 153b receives the effective signal SE2 from the in-level arbitration unit 151b, the priority flag SP2 from the priority flag generation unit 152b, and the effective signal SE3 from the in-level arbitration unit 151c. The in-level arbitration unit 153b selects one of the effective signals SE2 and SE3 in accordance with the priority flag SP2, and outputs, as an inter-level arbitration signal SA2, the selected effective signal.

The inter-level arbitration signals SA1 and SA2 output from the inter-level arbitration units 153a and 153b respectively are supplied to a channel determination unit 154. The channel determination unit 154 is supplied with channel numbers SN1 to SN3 output from the in-level arbitration units 151a to 151c, respectively. Based on the inter-level arbitration signals SA1 and SA2, the channel determination unit 154 sets the right to use the bus for one of the channel numbers SN1 to SN3, and outputs the channel number SD. The channel number SD is supplied to the memory controller 27 illustrated in FIG. 3.

FIG. 10 is a diagram illustrating the operation of the channel determination unit 154. In FIG. 10, "inter-level arbitration signal 1" indicates an arbitration signal SA1 output from the inter-level arbitration unit 153a. "Inter-level arbitration signal 2" indicates an arbitration signal SA2 output from the inter-level arbitration unit 153b, "Effective signal 3" indicates an effective signal SE3 output from the in-level arbitration unit 151c. An "inter-level arbitration signal" of "1" indicates that the channel number at a corresponding level of priority is effective, that is, a request is present.

Therefore, when an "inter-level arbitration signal" at a higher level is "1," the right to use the bus is set for the channel number at the higher level. When an "inter-level arbitration signal" is "0," the right to use the bus is set for the channel number at a lower level, that is, the lowest level.

Further, the channel settling unit 154 generates enabling signals ENa1 to ENc1 indicating whether the right to use the bus for the channel numbers SN1 to SN3 is set or not. The enabling signals ENa1 to ENc1 are output to the in-level arbitration units 151a to 151c, respectively.

An enabling signal ENb1 corresponding to a high level and an enabling signal ENc1 corresponding to a low level are supplied to the OR circuit 156. The OR circuit 156 performs the OR calculation of the enabling signals ENb1 and ENc1 and outputs the calculation result as an enabling signal ENa2 corresponding to the highest level. The enabling signal ENc1 corresponding to a lower level indicates that a channel number at another lower level is settled for the enabling signal ENb1. The enabling signal ENc1 output from the channel determination unit 154 is supplied to the priority flag generation unit 152b, as an enabling signal ENb2 indicating that a channel number at another lower level is settled.

Next, the configuration of the in-level arbitration unit 151a will now be described.

As illustrated in FIG. 11, the in-level arbitration unit 151a includes a determination unit 161, a selection unit 162, an information storage unit 163, and a rearrangement unit 164. A given number of request signals (in the present embodiment, all request signals W0 to W6) are supplied to the determination unit 161. Setting information stored in the information storage unit 163 is supplied to the determination unit 161.

The information storage unit 163 includes a plurality of (n number of) registers, $163_1$ to $163_n$. Setting information or unsetting information is stored in each of the registers $163_1$ to $163_n$. The setting information indicates the channel number for a DMA channel (processing unit) that outputs a request signal assigned to the in-level arbitration unit 151a among request signals W0 to W6 supplied to the determination unit 161. The unsetting information indicates that a channel number is not set. Since the information storage unit 163 includes the registers $163_1$ to $163_n$, channel numbers with the same value may be set in these registers. The setting information and the unsetting information are written via the selection unit 162 by the CPU 29 illustrated in FIG. 3.

The CPU 29 performs an initializing processing when a power source is turned on, and sets a channel number, which is the setting information, as a channel value. Each of the registers $163_1$ to $163_n$ outputs stored information (values).

Based on request signals W0 to W6, the determination unit 161 determines, for every service interval (the period of time for which use of the bus is permitted), whether there is a request for the right to use the bus from a DMA channel set at the level of priority for the in-level arbitration unit 151a. When there is such a request, the determination unit 161 outputs the channel number SN1 for the DMA channel, and the effective signal SE1 at, for instance, H level, which indicates a request. When there is no request, the determination unit 161 outputs the effective signal SE1 at, for example, L level.

The determination unit 161 determines whether each of request signals W0 to W6 indicates a request for the right to use the bus (e.g., whether each of the request signals W0 to W6 is at H level or not). This is determined by performing the OR calculation of the request signals W0 to W6. When there is such a request, the determination unit 161 sequentially compares the channel number of the request signal indicating the request with a set channel value output from each of the registers $163_1$ to $163_n$, and outputs a channel number initially matching the set channel value as the arbitration result of the in-level arbitration unit 151a, that is, a channel number SN1. Further, in addition to the output of the channel number SN1, the determination unit 161 outputs an effective signal SE1 indicating that the channel number SN1 is effective. Further, the determination unit 161 outputs pointer information, which indicates the register storing the set channel value initially matching the determined channel number, that is, the channel number of the request signal, to the rearrangement unit 164.

The rearrangement unit 164 receives information stored in all the registers $163_1$ to $163_n$. The rearrangement unit 164, which is, for example, a shift register, rearranges items of information such that the item of information stored in the register specified by pointer information supplied from the determination unit 161 is stored in the final register. The rearrangement unit 164 then outputs the rearrangement result to the selection unit 162. For example, when the determination unit 161 selects a request from a DMA channel that has a channel number equal to a set channel value stored in the second register $163_2$, the determination unit 161 outputs pointer information indicating the second register $163_2$. The rearrangement unit 164 rearranges (shifts) the items of information in accordance with pointer information such that information stored in the third to nth registers $163_3$ to $163_n$ are stored in the second to (n−1)th registers $163_2$ to $163_{n-1}$ and also information stored in the second register $163_2$ is stored in nth register $163_n$. Then, the rearrangement unit 164 outputs the shift result to the selection unit 162. In FIG. 11, the register $163_3$ is not illustrated.

The enabling signal ENa1 is supplied to the selection unit 162. The selection unit 162 writes information (setting information and unsetting information) input from the CPU 29 illustrated in FIG. 2 into the registers $163_1$ to $163_n$. Further, when an enabling signal ENa1 indicating that a request for a priority level is dealt with is supplied to the selection unit 162, the selection unit 162 writes information supplied from the rearrangement unit 164 into the registers $163_1$ to $163_n$. Using a round-robin method, the rearrangement unit 164 and selection unit 162 rearrange channel numbers stored in the information storage unit 163. Consequently, the order is changed within the levels of priority.

Next, the configuration of the priority flag generation unit 152a will now be described.

As illustrated in FIG. 12, the priority flag generation unit 152a includes a counter control unit 171, selection unit 172, counter 173, and flag control unit 174. The counter 173 includes counters 173a and 1.73b. Both the counters 173a and 173b are, for example, up-counters. A count-up value is stored in each of the counters 173a and 173b by the CPU 29 illustrated in FIG. 2. The corresponding count-up values stored in the counters 173a and 173b are values determined in accordance with the ratio of the upper side in-level arbitration unit (i.e., the in-level arbitration unit 151a) to the lower in-level arbitration unit (i.e., in-level arbitration unit 151b) based on order of priority. The count-up values stored in the counters 173a and 173b may be, for example, "4" and "3" respectively. Each of the counters 173a and 173b responds to a count-up signal output from the counter control unit 171 and counts up (+1). When the count value of each of the counters 173a and 173b matches with the corresponding count-up value, each counter 173a, 173b outputs a matching signal to the counter control unit 171 and also dears (=0) the count value.

An enabling signal ENa1 and an enabling single ENa2 are supplied to the counter control unit 171. The counter control unit 171 responds to the enabling signal ENa1 and outputs a count-up signal to the counter 173a. Further, the counter control unit 171 responds to the enabling signal ENa2 and outputs a count-up signal to the counter 173b. The enabling signal ENa1 indicates that the channel number at an upper level, namely, the channel number of the in-level arbitration unit 151a is settled when requests contend with each other between levels. The enabling signal ENa2 indicates that the channel number at a lower level, that is, a channel number at a level lower than that of the in-level arbitration unit 151a is settled when requests contend with each other between levels. The count value of the counter 173a indicates the number of times that a request from a higher level is dealt with by arbitration. The count value of the counter 173b indicates the number of times that a request from a lower level is dealt with.

Based on the respective matching signals output from the counters 173a and 173b, the counter control unit 171 outputs a flag control signal to the flag control unit 174. The flag control unit 174 responds to the flag control signal and generates a priority flag SP1. For example, when the counter control unit 171 counts up the counter 173 in response to the enabling signal ENa1, the counter control unit 171 outputs the flag control signal, and the flag control unit 174 outputs a priority flag (e.g., a value of "0", i.e., L level) which gives priority to a higher level. At this time, when effective signals SE1 and SE2 indicating requests are output from the in-level arbitration units 151a and 151b, the inter-level arbitration unit 153a illustrated in FIG. 8 responds to the priority flag SP1 with "0" and selects the effective signal SE1 at the higher level. Then, the inter-level arbitration unit 153a outputs the effective signal SE1 as an inter-arbitration signal SA1. This inter-level arbitration signal SA1 indicates that a request signal from between the upper and lower levels is dealt with.

When the counter 173a outputs a matching signal, the counter control unit 171 outputs a flag control signal, and the flag control unit 174 outputs a priority flag (e.g., a value of "1" or H level) that gives priority to a lower level. At this time, when effective signals SE1 and SE2 indicating requests are output from the in-level arbitration units 151a and 151b, the inter-level arbitration unit 153a illustrated in FIG. 8 responds to the priority flag SP1 with "1" and selects the effective signal SE2 at the higher level. Then, the inter-level arbitration unit 153a outputs the effective signal SE2 as an inter-arbitration signal SA1. This inter-level arbitration signal SA1 indicates that a request signal from between the upper and lower levels is dealt with.

Therefore, the inter-level arbitration unit 153a settles a request from the upper level and a request from the lower level the number of times indicated by the counter values set in the counters 173a and 173b of the priority flag generation unit 152a. That is, in accordance with the ratio of the count value set in the counter 173a to the count value set in the counter 173b, the inter-level arbitration unit 153a gives priority to the request from the higher level while also permitting the request from the lower level.

Since the in-level arbitration unit 151b has the same configuration as that of the in-level arbitration unit 151, it is not illustrated. At least one channel number is stored in the information storage unit 163 of the in-level arbitration unit 151b. Accordingly, by setting the channel number in the in-level arbitration unit 151b, a level of priority for the DMA channel of the channel number may easily be set. Further, by deleting a channel number set in the in-level arbitration unit 151a, and setting this channel number in the in-level arbitration unit 151b, a level of priority for the DMA channel of the channel number may easily be changed.

Further, the information storage unit 163 of each of the in-level arbitration units 151a and 151b includes a plurality of registers. Therefore, for example, in the in-level arbitration unit 151a, channel numbers of identical value are set in a plurality of registers. In this case, the number of registers set to channel numbers of identical value is equal to the number of rights to use the bus, which rights are given to the DMA channels of these channel numbers. That is, the priority may be raised from within the same level in accordance with the number of registers set to the channel numbers of identical value.

Channel numbers of identical value may also be set in different levels of priority. That is, channel numbers of identical value are set in the in-level arbitration units 151a and 151b. In this case, in the same manner as the foregoing, the right to use the bus is given to the DMA channel having the channel number the number of times equal to the number of registers.

Since the in-level arbitration unit 151c has the same configuration as that of the in-level arbitration unit 151a, it is not illustrated. Processing the same as that performed by the in-level arbitration unit 151b is also performed by this in-level arbitration unit 151c. That is, by setting a channel number to each of the in-level arbitration units 151a to 151c, level priority may easily be set. Further, by changing a channel number set, level of priority may easily be changed. Furthermore, when there is any processing unit that is not performing at this time, a channel number is not set in any of the in-level arbitration units 151a to 151c. Thereby, the right to use the bus is not permitted to the DMA channel with the channel number. Thus, since the right to use the bus, which is a resource, is not set for a DMA channel that is not needed, the right to use the bus may frequently be given to a DMA channel that is needed in comparison with the conventional case.

Since the priority flag generation unit 152b has the same configuration as that of the priority flag generation unit 152a, it is not illustrated. In the same manner as the priority flag generation unit 152a, values for dealing with requests from a higher level and a lower level are stored in the counters 173a and 173b of the priority flag generation unit 152b. Therefore, as illustrated in FIG. 8, the inter-level arbitration unit 153b, which receives the priority flag SP2 generated by the priority flag generation unit 152b, gives priority to a request from the higher level in accordance with the ratio of the count value set in the counter 173a to the count value set in the counter 173b, and permits a request from a lower level. As a result, even where the right to use the bus is continuously requested from the processing unit corresponding to a DMA channel set at a high level of priority, the right to use the bus is set for a DMA channel set at the lowest level of priority as well. That is, the right to use the bus may be set for all of the DMA channels with channel numbers set in the in-level arbitration units 151a to 151c.

Next, the flow of processing performed by the in-level arbitration unit will now be described with reference to FIG. 13.

First, a DMA channel is assigned to each in-level arbitration unit, that is, a channel number is set in each in-level arbitration unit (step 181). Next, the inter-level arbitration unit determines whether transfer is taking place or not, that is, whether a bus is being used or not (step 182). When transfer is taking place, the inter-level arbitration unit waits until the transfer is terminated. When the transfer is terminated, the inter-level arbitration unit determines whether there is a request from an assigned channel or not (step 183). When there is no request, the processing returns to step 182.

When there is a request from an assigned channel, the in-level arbitration unit retrieves request channels (step 184) and determines a priority channel (step 185). Next, the in-level arbitration unit determines whether the output of an effective signal to the in-level arbitration unit is disabled (inhibited) or not (step 186). When the output of the effective signal has not been disabled, the in-level arbitration unit outputs the effective signal and a channel number (step 187). Next, the in-level arbitration unit determines whether a corresponding group is selected, that is, the right to use the bus is set for the priority channel number or not (step 188). When the corresponding group is selected, channel numbers are rearranged (step 189). Next, the in-level arbitration unit determines whether all of the processing for one service is terminated or not (step 190). When all of the processing is terminated, the processing returns to step 182 to await the next request.

The flow of processing performed by the priority flag generation unit will now be described with reference to FIG. 14.

First, a priority-flag initial value and a priority ratio (count value) are set in the priority flag generation unit (step 191). Next, the priority flag generation unit determines whether there are any requests received for the priority flag, that is, at a level (higher or lower level) given priority at the time (step 192). When there are requests received, the priority flag generation unit determines whether the requests contend with each other or not (step 193). When the requests contend with each other, the priority flag generation unit counts down a count value corresponding to the priority flag (step 194).

Next, the priority flag generation unit determines whether the count value is "0" or not, that is, whether the number of requests received is the number set or not (step 195). When the count value is "0," the priority flag generation unit resets the priority ratio corresponding to the priority flag, that is, the count value (step 196). Next, the priority flag generation unit modifies the priority flag so as to invert it, that is, so as to switch the level given priority (step 197). Next, the priority flag generation unit determines whether all of processing for one service is terminated or not (step 198). When all of the processing is terminated, the processing returns to step 182 to await the next request.

In this manner, the in-level arbitration unit may include a processing unit that stores a program in which the processing illustrated in FIG. 13 is written, and that performs the program. Similarly, the priority flag generation unit may include a processing unit that stores a program in which the processing illustrated in FIG. 14 is written, and that performs the program.

Next, the operation of the processor 12 will now be described.

For example, as illustrated in FIG. 4, the processing units 21a and 21b output request signals R1a and R1b. The processing unit 22a outputs request signals R2a0 and R2a1, and the processing unit 22b outputs a request signal R2b.

The arbitration unit 26b receives request signals R2a0, R2a1, and R2b from the slave interfaces 81a to 81c respectively. The arbitration unit 26b outputs a request signal RA0 from the master interface 80a based on the request signal R2a0 received by the slave interface 81a. In accordance with the setting, the arbitration unit 26b arbitrates the request signals R2a1 and R2b received by the slave interfaces 81b and 81c, respectively. Based on the result of the arbitration, the arbitration unit 26b outputs a request signal RA1 from the master interface 80b. A request signal RA1 comprises a request signal R2a1 or request signal R2b.

The arbitration unit 26a receives the request signals RA0 and RA1 from the slave interfaces 72a and 72b respectively, and receives the request signals RA0 and RA1, output from the arbitration unit 26b, from the slave interfaces 72a and 72b, respectively. The arbitration unit 26a arbitrates the request signals R1a, R1b, RA0, and RA1 in accordance with setting, and outputs a request signal from the master interface 70.

For example, in the processing unit 26a, the priority for a request signal received by the slave interface 71a is set highest. Further, the priority for a request signal received by the slave interface 72a is set higher than that of a request signal received by the slave interface 72b. Further, the priority of a request signal received by the slave interface 71b is set higher than the priorities of request signals received by the slave interfaces 72a and 72b. Accordingly, the order of priority of the request signals R1a, R1b, RA0, and RA1 is set as described below.

$$R1a > R1b > RA0(R2a0) > RA1(R2a1 \text{ or } R2b)$$

Here, by changing the setting of the priority order of request signals received by the slave interface 71b, the order of priority of the request signals R1a, R1b, RA0, and RA1 is set as described below.

$$R1a > RA0(R2a0) > R1b > RA1(R2a1 \text{ or } R2b) \text{ or}$$

$$R1a > RA0(R2a0) > RA1(R2a1 \text{ or } R2b) > R1b$$

As illustrated in FIG. 3, the arbitration circuit 26 includes the arbitration units 26a to 26e. Each of the processing units 21a to 25c is coupled to one of the arbitration units 26a to 26e in accordance with the frequency of the performance of each processing. For example, the frequency of the performance of the processing by the processing units 21a to 21f is higher than that by the processing units 22a to 25c. Thus, the processing units 21a to 21f are coupled to the arbitration unit 26a directly. Each of the processing units 22a to 25c is coupled to one of the arbitration units 26b to 26e in accordance with whether each processing is simultaneous or exclusive. The arbitration units 26b to 26e are coupled to the arbitration unit 26a.

In accordance with the operating mode of the imaging device, the CPU 29 stops the supply of clock signals to any processing units that are not required to operate at that time. For example, as illustrated in FIG. 4, the clock signal CK2 from the clock controller 28b is supplied to the processing units 22a and 22b via the clock buffer 32b. Further, via the clock buffers 32f, the clock signal CK2 is supplied to the arbitration unit 26b and the slave interfaces 72a and 72b of the arbitration unit 26a. The CPU 29 stores a set value in the register 61 of the clock controller 28b, and the switch 62 is turned off in accordance with the value set in the register 61. Consequently, output of clock signals CK2 is stopped. As a result, the processing units 22a and 22b, the arbitration unit 26b, and the slave interfaces 72a and 72b of the arbitration unit 26a cease operation. Furthermore, the clock buffer 32b disposed in the path supplied with clock signals CK2 also ceases operation. As a result, power consumption is reduced in the processor 12, and hence in the imaging device.

As illustrated in FIG. 4, the processing unit 21a includes a switch 42a that is turned on and off in accordance with a value set in the register 41a. Similarly, the processing unit 21b includes the switch 42b that is turned on and off in accordance with a value set in the registers 41b. Accordingly, the processing units 21a and 21b may be stopped by values set in the registers 41a and 41b, respectively. Similarly, the processing units 22a and 22b include switches 52a and 52b, respectively, which are turned on and off in accordance with corresponding values set in the registers 51a and 51b, respectively. Therefore, the processing units 22a and 22b may be stopped by values set in the registers 51a and 51b, respectively. The processing units 21a to 21f and 23a to 25c are also configured in the same manner as the foregoing processing units. Therefore, the processing units 21a to 25c may be stopped in accordance with whether the processing units 21a to 25c are operating or not. As a result, power consumption is reduced in the processor 12 and hence the imaging device.

The present embodiment has the following advantages.

(1) A clock signal CK2 output from the clock controller 28b is supplied to the processing units 22a and 22b. The clock controller 28b includes a register 61, which stores a value set by the CPU 29, and a switch 62, which is turned on and off in accordance with the value set in the register 61. When the switch 62 is turned off in accordance with the value set in the register 61, the output of the clock signal CK2 is stopped. Accordingly, the processing units 22a and 22b operated based on the clock signal CK2 cease operation. Thus, by stopping output from the clock signal in accordance with an operation state of the imaging device (processor 12), power consumption in the processor 12 and hence imaging device may be reduced compared to the case where all clock signals are supplied.

(2) The processing units 21a, 21b, 22a, and 22b include switches 42a, 42b, 52a, and 52b, respectively, which are turned on and off in accordance with values set in registers 41a, 41b, 51a, and 51b, respectively. Accordingly, by setting values in the registers 41a to 51b, the processing units 21a to 22b may be stopped independently. Therefore, even when the arbitration unit 26b coupled to the processing units 22a and 22b, power consumption in the processor 12 may be reduced by stopping the processing units 22a and 22b in accordance with processing.

(3) The arbitration unit 26b includes the conversion unit 84 configured such that a master number corresponding to a request signal arbitrated by the arbitration function unit 82 is converted into the interface number of the master interface 80a or 80b and a request signal is output from the master interface corresponding to the interface after conversion. The arbitration unit 26a is configured such that request signals received from the slave interfaces 72a and 72b coupled to the master interfaces 80a and 80b of the arbitration unit 26b are arbitrated in accordance with levels of priority corresponding to the slave interfaces 72a and 72b. Accordingly, by changing conversion information in the conversion unit 84, slave interfaces 72a and 72b for supplying request signals may be modified. As a result, order of priority with respect to a request signal may easily be changed. Thus, the level of priority of a processing unit required for the current processing is raised in accordance with the stopped processing units 22a to 25c or arbitration units 26b to 26e, thereby enabling efficient processing.

It should be apparent to those skilled in the art that the above embodiment may be embodied in many other specific forms without departing from the scope of the invention. Particularly, it should be understood that the above embodiment may be embodied in the following forms.

The number of the master interfaces of each arbitration unit may be modified if necessary. For example, an arbitration circuit 200 includes a plurality of (two in FIG. 15) arbitration units 201a and 201b. The arbitration unit 201a includes one master interface 211 and a plurality of (three in FIG. 15) slave interfaces 212a, 212b, and 213. The arbitration unit 201b includes one master interface 221 and a plurality of (three in FIG. 15) slave interfaces 222a to 222c.

The arbitration unit 201a and the processing units 231a and 231b operate based on a clock signal CK1 output from the clock controller 28a. The arbitration unit 201b, processing units 241a to 241c, and the slave interface 213 of the arbitration unit 201 operates based on a clock signal CK2 output from the clock controller 28b.

The arbitration unit 201b receives request signals W1a to W1c, which are output from processing units 241a to 241c, at slave interfaces 222a to 222c. Then, the arbitration unit 201b arbitrates request signals W1a to W1c, and outputs a request signal WA corresponding to the result of the arbitration, from the master interface 221. The request signal WA is one of the request signals W1a to W1c.

The arbitration unit 201a receives request signals W0a and W0b, which are output from the processing units 231a and 231b, at the slave interfaces 212a and 212b, and receives a request signal, which is output from arbitration unit 201b, at the slave interface 213. The arbitration unit 201a arbitrates the request signals W0a, W0b, and WA in accordance with the setting, and outputs a request signal corresponding to the result of the arbitration from the master interface 211.

In the arbitration unit 201a of the arbitration circuit 200 with such a configuration, the order of priority of the request signals W0a, W0b, and WA may be set as described below.

$$W0a > W0b > WA(W1a \text{ or } W1b \text{ or } W1c) \text{ or}$$

$$W0a > WA(W1a \text{ or } W1b \text{ or } W1c) > W0b$$

Further, as illustrated in FIG. 16, an arbitration circuit 250 includes a plurality of (two in FIG. 16) arbitration units 251a and 251b. The arbitration unit 251a includes two master interfaces 261a and 261b and a plurality of (four in FIG. 16) slave interfaces 262a, 262b, 263a, and 263b. The master interface 261a is coupled to a memory 14a via a memory controller 27a, and the master interface 261b is coupled to a memory 14b via a memory controller 27b. That is, the arbitration unit 251a is coupled to the two bus slaves. The arbitration unit 251b includes two master interfaces 271a and 271b and a plurality of (three in FIG. 16) slave interfaces 272a to 272c.

The arbitration unit 251a and the processing units 231a and 231b operate based on a clock signal CK1 output from the clock controller 28a. The arbitration unit 251b, the processing units 241a to 241c, and the slave interface 263a and 263b of the arbitration unit 251a operate based on a clock signal CK2 output from the clock controller 28b.

The arbitration unit 251b receives request signals W1 to W1, which are output from the processing units 241a to 241c, at the slave interfaces 272a to 272c. The arbitration unit 251b arbitrates the request signals W1 to W1 in accordance with the setting, and outputs request signals WA0 and WA1 corresponding to the result of the arbitration from the master interfaces 271a and 271b. For example, the arbitration unit 251b outputs the request signal WA0 based on the request signal W1a, and outputs the request signal WA1 corresponding to the result of the arbitration of the request signals W1b and W1c.

The arbitration unit 251a receives request signals W0a and W0b, which are output from the processing units 231a and 231b, at the slave interfaces 262a and 262b, and receives request signals WA0 and WA1, which are output from the arbitration unit 251b, at the slave interfaces 263a and 263b. The arbitration unit 251a arbitrates request signals W0a, W0b, WA0, and WA1 in accordance with setting, and outputs a request signal corresponding to the result of the arbitration from the master interfaces 261a and 261b. For example, the arbitration unit 251a outputs from the master interface 261a a request signal matching the result of the arbitration of the request signal W0a and request signal WA0. Further, the arbitration unit 251a outputs from the master interface 261b a request signal corresponding to the result of the arbitration of the request signal W0b and WA1.

By means of this arbitration circuit 250, for example, the processing units 231a and 241a access the memory 14a, and the processing units 231b and the processing units 241b and 241c access the memory 14b. Further, setting may be made so that the processing units 231a and 241a access the memory 14b whereas the processing units 231b and the processing units 241b and 241c access the memory 14a. Thus, the bus master and slave may easily be set.

Processing in the arbitration unit may be modified if necessary. For example, as illustrated in FIG. 17, the arbitration unit 301a includes slave interfaces 71a, 71b, 72a, and 72b, an arbitration function unit 311, and a CPU interface 77. For example, in the same manner as the arbitration unit 26a illustrated in FIG. 5, the slave interfaces 71a and 71b are coupled to the processing units 21a and 21b illustrated in FIG. 3. The slave interfaces 72a and 72b are coupled to the master interfaces 80a and 80b of the arbitration units 301b. In FIG. 17, a master interface in the arbitration unit 301a is not illustrated.

The arbitration unit 301b includes master interfaces 80a and 80b, slave interfaces 81a to 81c, an arbitration function unit 321, and an interface selection unit 322. The interface selection unit 322 includes a conversion unit 323, a switching unit 85, and a CPU interface 96. The CPU 29 sets, in the conversion unit 323, a threshold value for order of priority (level of priority) in the arbitration unit 301b.

In accordance with order of priority (level of priority) set in the processing units that have output the request signal, the arbitration function unit 321 arbitrates request signals received by the slave interfaces 81a to 81c. Then, the arbitration function unit 321 outputs level of priority (priority information) together with a request signal corresponding to the result of the arbitration.

The conversion unit 323 compares the threshold value set and the level of priority, and sets an interface number in accordance with the result of the comparison. For example, the conversion unit 323 converts a level of priority higher than the threshold value into an interface number for the master interface 80a. The switching unit 85 supplies request signals to the master interfaces 80a and 80b in accordance with the converted interface number.

For example, order of priority of a request signal R1a received by the slave interface 81a is set highest (level of priority=0). Order of priority of a request signal R1b received by the slave interface 81b is set intermediate (level of priority=1). Order of priority of a request signal R1c received by the slave interface 81c is set lowest (level of priority=2). The threshold value for level of priority is set at "0." In this case, the conversion unit 323 converts a priority of "0" into an interface number of the master interface 80. Consequently, the request signal R1a is output from the master interface 80a, and request signals R1b and R1c are output from the master interface.

The arbitration function unit 311 of the arbitration unit 301a arbitrates request signals R0a and R0b received by the slave interfaces 71a and 71b and request signals RA0 and Ra1 received by the slave interfaces 72a and 72b in accordance with the setting, and outputs a request signal corresponding to the results of the arbitration. Here, when a threshold (=0) is set as described above, the request signal RA0 is a request signal R1a, and the request signal RA1 is a request signal R1b or a request signal R1c.

In this case, order of priority in the arbitration function unit 311 is set as described below.

R0a>R0b>RA0(R1a)>RA1(R1b or R1c)

The order of priority may be modified as described below by changing the setting in the CPU 29.

R0a>RA0(R1a)>R0b>RA1(R1b or R1c) or

R0a>RA0(R1a)>RA1(R1b or R1c)>R0b

Further, the arbitration function unit 311 monitors queues in the slave interfaces 72a and 72b and modifies threshold values for the level of priority in the conversion unit 323. As described above, when the threshold is set at "0," the request signal R1a (request signal RA0) is output from the master interface 80a and stored in the queue in the slave interface 72a. Further, the request signal R1b or R1c (request signal RA1) is output from the master interface 80b and stored in the queue in the slave interface 72b. The arbitration function unit 311 sequentially selects request signals stored in the queues in the slave interfaces 72a and 72b.

For example, when request signals R1a to R1c are generated by the corresponding processing units during a certain time, the number of request signals stored in the queue in the slave interface 72b becomes twice as large as that of request signals stored in the queue in the slave interface 72a. Based on the queues, the arbitration function unit 311 modifies the threshold value in the conversion unit 323 to, for example, "1." Consequently, the conversion unit 323 converts a level of priority of "0" and a level of priority of "1" to the interface number of the master interface 80a and also converts a level of priority of "2" to the interface number of the master interface 80b. As a result, the request signals R1a and R1b are output from the master interface 80a and the request signal R1c is output from the master interface 80b.

The request signal RA0 (R1a or R1b) output from the master interface 80a of the arbitration unit is stored in the queue in the slave interface 72a. The request signal RA1 (R1c) output from the master interface 80b is stored in the queue in the slave interface 72b. The arbitration function unit 311 gives the request signal RA0 (R1a or R1b) received by the slave interface 72a priority over the request signal RA1 (R1c) received by the slave interface 72b. Accordingly, the order of priority of the request signals R1a to R1c is modified by the threshold value in the conversion unit 323. Thus, the levels of priority of the request signals R1a to R1 may easily be modified.

Further, the number of request signals stored in the queue of each of the slave interfaces 72a and 72b changes in accordance with the threshold set in the conversion unit 323. Therefore, the time required to output a received signal in relation to a request signal output from the corresponding processing unit coupled to the arbitration unit 301b may be shortened. Accordingly, when a clock signal is supplied or stopped, time required for processing relating to a received request signal to be finished after reception of the request signal is suspended is shortened. Thus, time required to supply or stop the clock signal CK2 with respect to the processing unit coupled to the arbitration units 301b and 201b may be shortened.

In the embodiment describe above, output of the clock signals CK2 to CK5 from the clock controllers 28b to 28e, respectively, is stopped. However, in accordance with the setting in each register, frequencies generated by the clock signals CK2 to CK5 may be modified; for example, they may be decreased.

Alternatively, the processor may include a clock controller for stopping clock signals and a clock controller for modifying the frequency of clock signals. For example, in FIG. 3, the clock controller 28b may stop the clock signal CK2 in accordance with control information, and the clock controller 28c may modify the frequency of the clock signal CK3.

The clock controller in the embodiment described above may include a frequency dividing circuit, which may divide a generated frequency. In this case, in accordance with operation of the imaging device, the frequency dividing circuit may modify a frequency division ratio for the frequencies generated. For example, when any processing unit is not used, the frequencies of clock signals supplied to this processing unit are reduced compared to those when that processing unit is used. Thus, power consumption in each processing unit and hence in the imaging device may be reduced.

In the embodiment described above, the number of processing units 21a to 25c, the content of processing performed by each of the processing units 21a to 25c, and the connection between the processing units 21a to 25c and arbitration units 26a to 26e are examples, and may be modified as necessity requires. For example, the interface (e.g., HDMI: High-Definition Multimedia Interface) for external connection may be coupled to, for example, the arbitration unit 26d illustrated in FIG. 3 as a processing unit.

The processor 12 may further include an additional arbitration unit for arbitrating request signals output from the processing units 21a to 21f. In this case, the arbitration unit 26a outputs a request signal corresponding to the result of the arbitration of a request signal output from the additional arbitration unit and request signals output from the arbitration units 26b to 26e.

In the embodiment described above, the CPU 29 stores set values (control information) in the corresponding registers of the clock controller so as to stop clock signal supply. Instead of this, the CPU 29 may output a control signal (e.g., enabling signal) as control information. For example, each of the clock controllers 28b to 28e outputs a clock signal in response to a control signal at the first level (e.g., H level), and stops the output of the clock signal in response to a control signal at the second level (e.g. L level). In the same manner as the embodiment described above, a clock signal may be output or stopped by a switch that is turned on and off in response to a control signal.

Similarly, the processing units 22a and 22b illustrated in FIG. 5 may be activated or stopped by a control signal output from the CPU 29. In this case, a decoder may be used to decode a control signal (control information) output from the CPU 29 into control signals corresponding to each of the processing units 22a and 22b. This is the same for the processing units 23a to 25c illustrated in FIG. 3.

In the embodiment described above, a notification that is output from the arbitration unit 26a to the CPU 29 and indicates that a configuration modification is possible is not limited to an interruption signal. Alternatively, the notification may be, for example, another signal or command received by the CPU 29 or a value stored in a register.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments of the present invention have been described in detail, it should be understood that various changes, substitutions, and alterations could be made hereto without departing from the spirit and scope of the invention.

The invention claimed is:

1. A processor, comprising:
a plurality of processing units;
a plurality of first arbitration units which each arbitrate request signals output from at least two of the plurality of processing units to generate a first arbitration signal;
a second arbitration unit which arbitrates first arbitration signals output from the plurality of first arbitration units to generate a second arbitration signal;
a plurality of clock controllers which are arranged in correspondence with the plurality of first arbitration units and which each generate a clock signal supplied to a corresponding first arbitration unit and the processing units coupled to the corresponding first arbitration unit; and
a control unit which determines whether or not to operate each of the processing units in accordance with an operation state of the processor and generates control information according to a determination result;
wherein each of the plurality of clock controllers supplies or stops the clock signal or changes a frequency of the clock signal, for the corresponding first arbitration unit and the processing units coupled to the corresponding first arbitration unit, in accordance with the control information.

2. The processor according to claim 1, wherein the second arbitration unit is coupled to at least one of the processing units and generates the second arbitration signal by arbitrating the request signal output from the at least one of the processing units and the first arbitration signals.

3. The processor according to claim 1, wherein each of the processing units is coupled to any one of the first arbitration units or the second arbitration unit based on a processing to be performed by each processing unit or the frequency of the performance of the processing.

4. The processor according to claim 2, wherein
the control unit instructs the second arbitration unit to perform a configuration modification in accordance with the operation state of the processor,
the second arbitration unit suspends reception of the request signals and the first arbitration signals in response to the instruction of the configuration modification and outputs a configuration modifiable signal after data transfer associated with the request signals or first arbitration signals received before the suspension is terminated,
the control unit outputs the control information in response to the configuration modifiable signal, and
the second arbitration unit performs the configuration modification in accordance with the control information and then resumes the reception of the request signals and the first arbitration signals.

5. The processor according to claim 1, wherein
each of the first arbitration units includes
a plurality of master interfaces coupled to the second arbitration unit,
an arbitration function unit which outputs the first arbitration signal and outputs a master number indicating the processing unit that has output the request signal corresponding to the first arbitration signal, and
an interface selection unit which outputs the first arbitration signal to one of the master interfaces based on the master number.

6. The processor according to claim 1, wherein
each of the first arbitration units includes
a plurality of master interfaces coupled to the second arbitration unit,
an arbitration function unit which outputs the first arbitration signal in accordance with an order of priority and outputs information indicating the order of priority, and
an interface selection unit which outputs the first arbitration signal to one of the master interfaces based on the information indicating the order of priority.

7. The processor according to claim 6, wherein
the second arbitration unit includes
a plurality of slave interfaces coupled to the master interfaces, and
an arbitration function unit which arbitrates the first arbitration signals received by the plurality of slave interfaces in accordance with the order of priority, and
the second arbitration unit changes the order of priority in accordance with the number of the first arbitration signals stored in a queue of each of the plurality of slave interfaces.

8. A processor comprising:
a plurality of processing units which each generate a request signal with respect to a bus slave; and
an arbitration circuit which arbitrates request signals output from the plurality of processing units, wherein
the arbitration circuit includes
a first arbitration unit which arbitrates request signals output from at least two of the plurality of processing units to generate a first arbitration signal, and
a second arbitration unit which arbitrates the request signal output from at least one of the plurality of processing units and the first arbitration signal to generate a second arbitration signal, and
each of the processing units is coupled to the first arbitration unit or the second arbitration unit based on a processing to be performed by each processing unit or the frequency of the performance of the processing,
the processor further comprising:
a first clock controller which generates a first clock signal supplied to the first arbitration unit and the processing units coupled to the first arbitration unit; and
a control unit which determines whether or not to operate each of the processing units in accordance with an operation state of the processor and supplies control information according to a determination result to the first clock controller,
wherein the first clock controller supplies or stops the first clock signal or changes a frequency of the first clock signal, for the first arbitration unit and the processing units coupled to the first arbitration unit, in accordance with the control information.

9. The processor according to claim 8, further comprising
a second clock controller which generates a second clock signal supplied to the second arbitration unit and the processing units coupled to the second arbitration unit.

10. A control method for a processor, the control method comprising:
arbitrating, by a first arbitration unit, request signals output from a plurality of first processing units to generate a first arbitration signal, the first processing units and the first arbitration unit being operated by a first clock signal generated by a first clock controller;
arbitrating, by a second arbitration unit, request signals output from a plurality of second processing units and the first arbitration signal output from the first arbitration unit, the second processing units being operated by a second clock signal generated by a second clock controller;

determining whether or not to operate each of the first processing units, which are coupled to the first arbitration unit, in accordance with an operation state of the processor and generating control information according to a determination result; and supplying or stopping the first clock signal or changing a frequency of the first clock signal, for the first arbitration unit and the first processing units, in accordance with the control information.

* * * * *